United States Patent [19]

Honjo et al.

[11] Patent Number: 4,817,933
[45] Date of Patent: Apr. 4, 1989

[54] DOCUMENT HANDLING APPARATUS

[75] Inventors: Takeshi Honjo, Kawasaki; Naomi Takahata, Yokohama, both of Japan

[73] Assignee: Canon Kabushiki Kaisha, Tokyo, Japan

[21] Appl. No.: 780,576

[22] Filed: Sep. 26, 1985

[30] Foreign Application Priority Data

| Oct. 2, 1984 | [JP] | Japan | 59-206619 |
| Oct. 2, 1984 | [JP] | Japan | 59-206620 |
| Oct. 2, 1984 | [JP] | Japan | 59-206621 |
| Oct. 2, 1984 | [JP] | Japan | 59-206622 |
| Oct. 2, 1984 | [JP] | Japan | 59-206623 |
| Oct. 2, 1984 | [JP] | Japan | 59-206624 |
| Oct. 2, 1984 | [JP] | Japan | 59-206625 |

[51] Int. Cl.$^4$ .............................. B65H 5/22
[52] U.S. Cl. ..................... 271/3.1; 271/184; 271/185; 271/186; 271/225; 271/902
[58] Field of Search ............... 271/3.1, 182, 183, 184, 271/185, 186, 202, 225, 270, 902, 265, 266, 272, 176, 242, 259, 261

[56] References Cited

U.S. PATENT DOCUMENTS

| 4,384,782 | 5/1983 | Acquaviva | 271/3.1 X |
| 4,411,517 | 10/1983 | Gerken | 271/3.1 |
| 4,422,751 | 12/1983 | Komiya et al. | 271/3.1 |
| 4,544,148 | 10/1985 | Kitajima et al. | 271/3.1 |
| 4,579,327 | 4/1986 | Furuichi | 271/3.1 |
| 4,667,951 | 5/1987 | Honjo et al. | 271/259 |
| 4,723,772 | 2/1988 | Honjo et al. | 271/3.1 |
| 4,727,398 | 2/1988 | Honjo et al. | 355/3 SH |
| 4,751,550 | 6/1988 | Murakami | 355/14 SH |

FOREIGN PATENT DOCUMENTS 58-95040 6/1983 Japan .................. 271/242

OTHER PUBLICATIONS

IBM Technical Disclosure Bulletin, vol. 24, no. 1B, pp. 547 and 548, "Short-Paper Detection in Paper Path", by M. Kida.

Primary Examiner—H. Grant Skaggs
Assistant Examiner—David H. Bollinger
Attorney, Agent, or Firm—Fitzpatrick, Cella, Harper & Scinto

[57] ABSTRACT

An automatic document feeder, for example for a copier, in which the feed timing of a document is variably determined as a function of the size of an immediately preceding document, thus enabling stable feed and discharge of documents different in size.

8 Claims, 23 Drawing Sheets

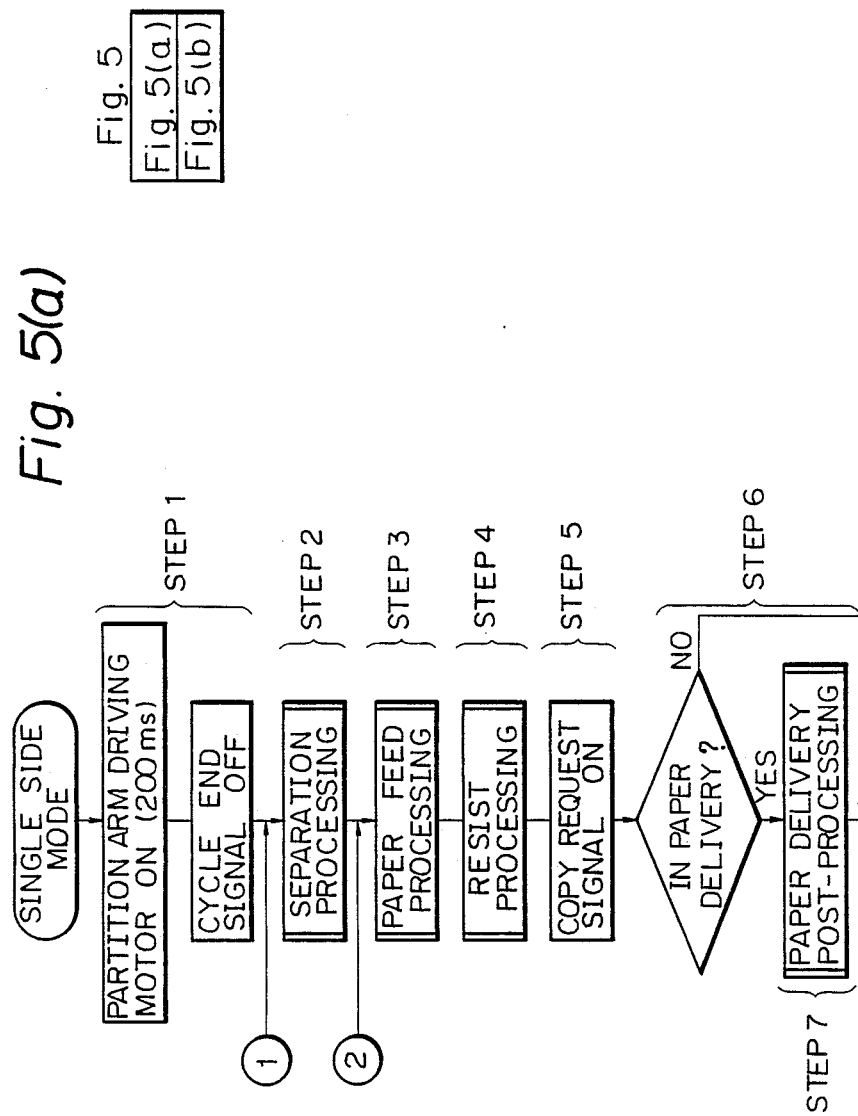

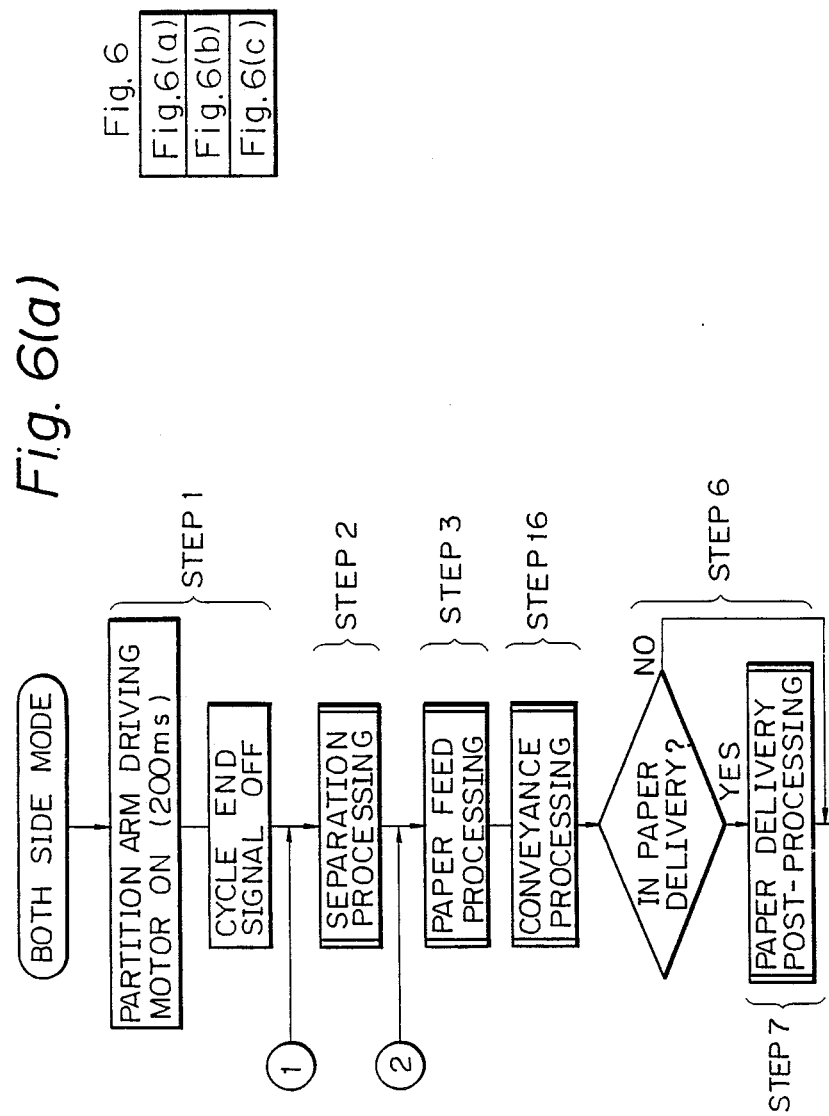

| Fig. 8-2 |
|---|
| Fig. 8-2a |
| Fig. 8-2b |

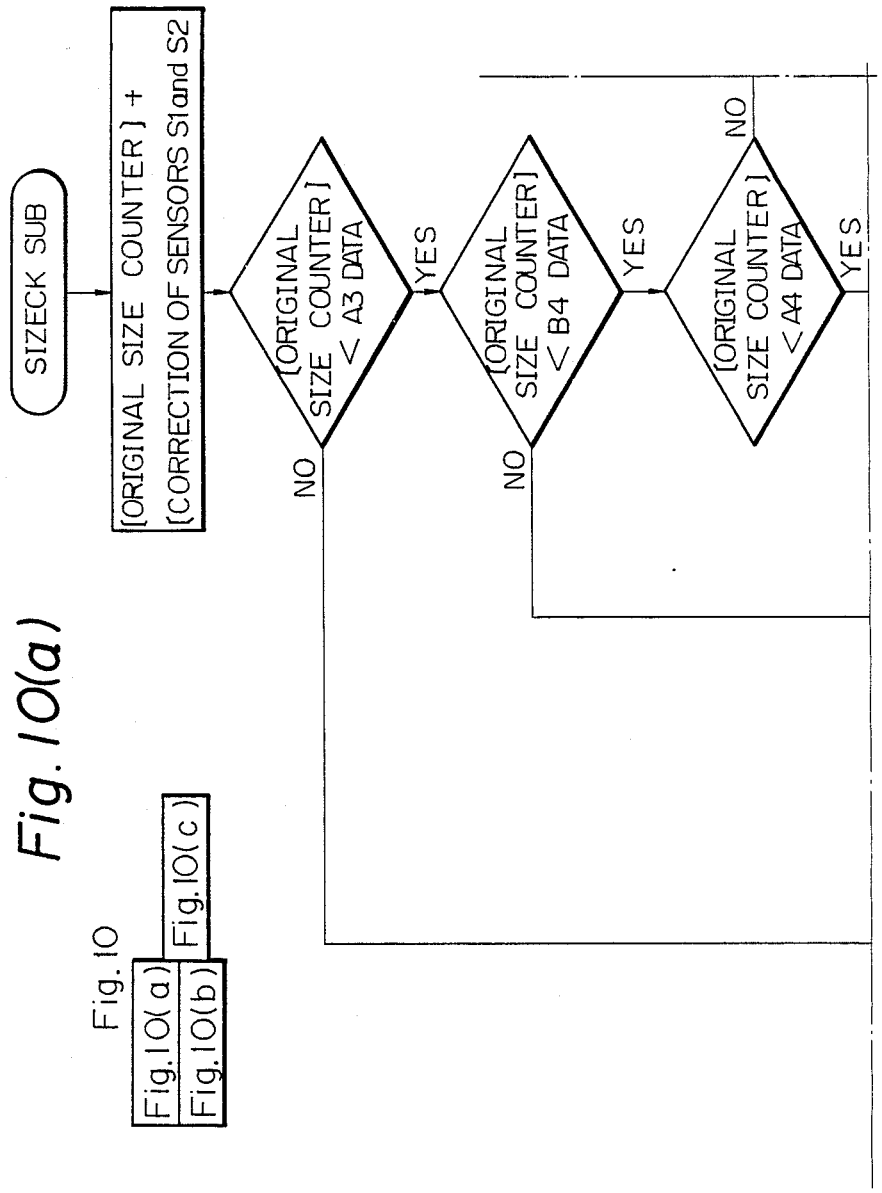

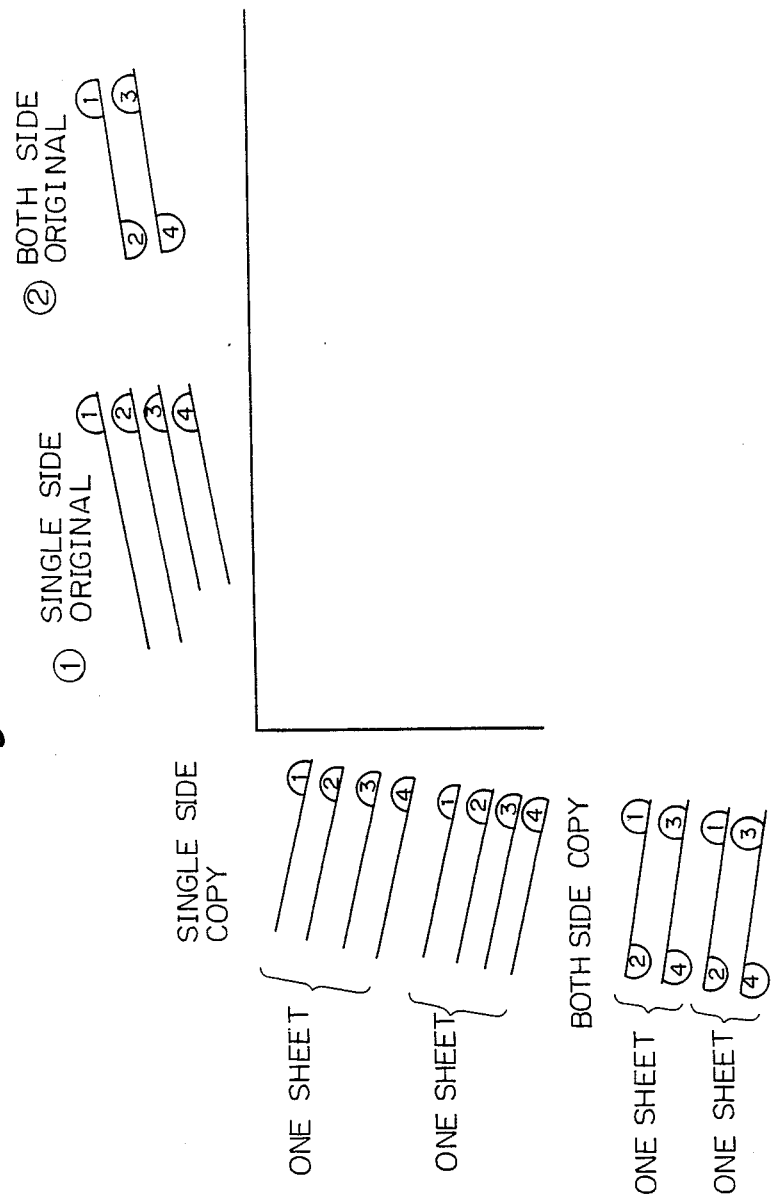

DOCUMENT HANDLING APPARATUS

BACKGROUND OF THE INVENTION

1. Field of the Invention

The present invention relates to a document handling apparatus for feeding original documents to a position for exposure and discharging said documents from said position after exposure thereof.

2. Description of the Prior Art

Such document handling apparatus is typically exemplified by a circulating automatic document feeder equipped with an image forming apparatus such as a copier.

In such known apparatus, sheet documents are stacked on a sheet document stacker tray and there is executed a cycle, for each of said documents, of separating a sheet document from said stack, feeding the thus separated document to a glass platen of said image forming apparatus where said document is to be illuminated and exposed, returning said document to said stacker tray after exposure and feeding a succeeding document to said platen glass. In this manner one or plural copies for each of the original documents can be obtained by circulating the stacked documents once or plural times, and such apparatus is extremely useful for automatic rapid copying or other processing of a large number of sheet documents.

In such known document handling apparatus it has already been proposed to simplify the structure by feeding and discharging the documents at the same time to and from a side of the platen glass. However, rapid movement of documents is extremely difficult in such a system, because they have to be moved in the forward and backward directions, and such structure requires high precision in order to prevent jamming or damage of documents.

Also, in such known document handling apparatus, the discharge of a document from the position for exposure and the feeding of a succeeding document to said position are conducted at a fixed interval, which is determined on the basis of a maximum possible size even when smaller documents are handled. For this reason the feeding of a document often requires an unnecessarily long time, thus delaying the copying operation.

Furthermore, in such known apparatus, it has been customary to detect the passing of the rear end of an original document at a determined position in the document feed path, to set said document at a position for exposure on the platen glass after a determined delay from said detection, and, after the exposure, to discharge said document simultaneously with the feeding of a succeeding document.

Consequently, if documents of plural sizes are mixed in the stack and if a larger document, for example A3 size, is exposed and to be followed by a smaller document, for example A4 size, the former may still remain on the platen glass when the succeeding one is set at the position for exposure.

Furthermore, such known apparatus is designed in such a manner that a document discharged onto the stacker tray slides thereon to a sheet feed slot spontaneously. It therefore often happens that the documents are stopped for some reason and do no reach the feed slot.

Furthermore, some of such known apparatus detect the size of document during transportation thereof by counting clock pulses generated in synchronization with the function of document transporting means, during an interval between the detections of the front and rear ends of a document with a sensor.

However, such size detecting method is hardly capable of exact size detection in the case that the apparatus contains plural document conveyors of different speeds driven by separate power sources and the document is transferred among such different conveyors. Also, such size detecting method is incapable of size determination until the document has completely passed the position of the sensor.

Furthermore, some of such known apparatus are designed to handle two-sided original documents. In such apparatus, the inversion of the document, required for making copies from such two-sided original document, is achieved by a so-called switchback operation in which a document is advanced in a direction with rollers, then stopped while being pinched by said rollers and then reversed in the opposite direction by reversing the direction of said rollers.

However, in such switch-back operation, the reversing of the transport direction while the document is pinched between the rollers tends to apply an uneven advancing force to the document, thus resulting in problems such as skewed advancement.

Also, such apparatus has two operation modes; i.e., a first mode in which the original document has to be precisely stopped at the position for exposure on the platen glass, and a second mode in which the document need not be stopped at a precise position on the platen glass as it is used as a part of a switch-back path for inverting the document. However, the conventional apparatus has employed a control method for precisely stopping the document in both modes, thus requiring a lower transport speed and a more complicated control process than would otherwise be needed.

SUMMARY OF THE INVENTION

In consideration of the foregoing, an object of the present invention is to provide an improved document handling apparatus.

Another object of the present invention is to provide a document handling apparatus capable of satisfactory transportation of original documents.

Still another object of the present invention is to provide a document handling apparatus capable of preventing jamming of or damage to original documents.

Still another object of the present invention is to provide a document handling apparatus capable of stable feeding and discharge of the original documents regardless of the size thereof.

Still another object of the present invention is to provide a document handling apparatus capable of reducing time required for document feeding.

Still another object of the present invention is to provide a document handling apparatus capable of exactly determining the sheet size within a short time and with a simple structure.

Still another object of the present invention is to provide a document handling apparatus capable of secure circulation of the original documents.

Still another object of the present invention is to provide a document handling apparatus capable of stable handling of two-sided documents with a simple structure.

According to the present invention, these objects are attained by providing a document handling apparatus having a document transport means which feeds an original document to an exposure position and discharges it therefrom, the feeding and the discharge being performed on the same side of the exposure position, means for detecting the size of the original document to be fed, means for storing the detected size, and means for controlling the document transport means in such a manner that discharge of one document is conducted simultaneously with the feeding of the next document, with the document being discharged and that being fed mutually overlapping and sliding on each other at some time during the course of the feeding and discharge. The control means controls timing of the feeding of the next original in accordance with the detected size of the preceding original so that the amount of overlap is constant regardless of the sizes of the two documents.

In another aspect, the invention provides a document handling apparatus having a stacker, means for separating documents which are on the stacker, transport means for feeding a separated document to an exposure position, means for detecting the size of each document to be fed, and control means which controls the separating means to adjust the timing of separation of the next document in accordance with the detected size of the previous document. In another aspect, the present invention is directed to a document handling apparatus having document transport means operable in a first mode for feeding a document to a support for exposure or in a second mode for feeding a onto the support for causing a switchback movement of the document, and means for controlling the document transport means in such a manner as to stop the document on the support in the first mode differently from the stop position of the document on the support in the second mode, the latter being upstream of the stop position in the first mode (in the feed direction of the document).

The foregoing and still other objects of the present invention, and the advantages thereof, will become fully apparent from the following description.

BRIEF DESCRIPTION OF THE DRAWINGS

FIG. 1(a) is an external perspective view of an automatic document feeder embodying the present invention and mounted on a copier;

FIGS. 5(a) and 5(b) are charts showing the control procedure in a single-side mode;

FIGS. 6(a)-6(c) are flow charts showing the control procedure in a two-side mode;

FIGS. 11 to 13 are schematic views showing the function of the document feeder.

DETAILED DESCRIPTION OF THE PREFERRED EMBODIMENTS

Now the present invention will be clarified in greater detail by an embodiment thereof shown in the attached drawings.

Figure 1:
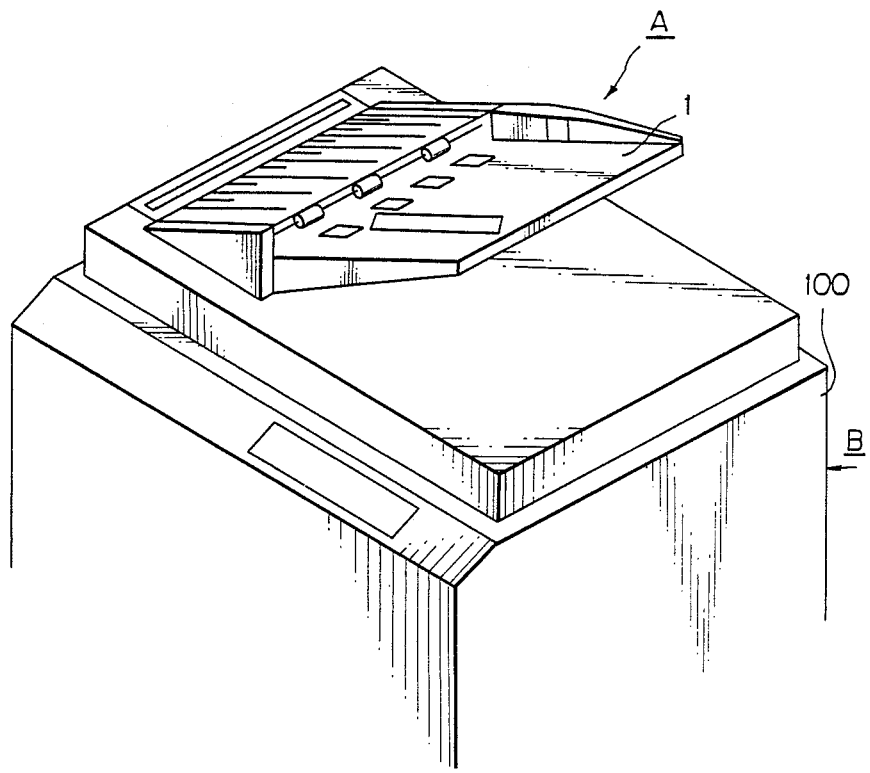
FIGS. 7-1 to 7-3, 8-1, 8-2(a) and (b), 9-1 to 9-4 and 10(a)-(c) are flow charts showing the details of steps in FIGS. 5 and 6.
Figure 1B:
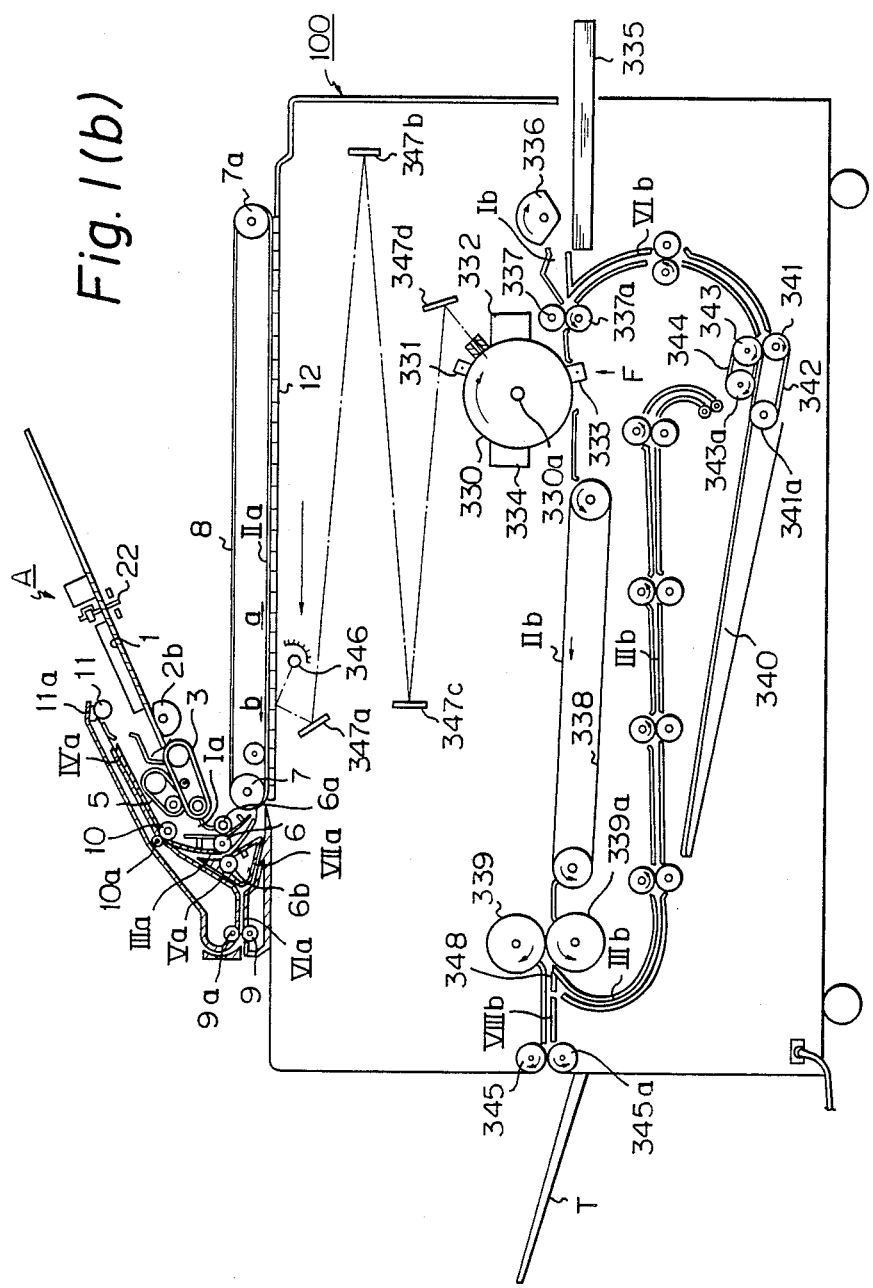
FIG. 1(b) is a cross-sectional view of thereof.
Figure 2:
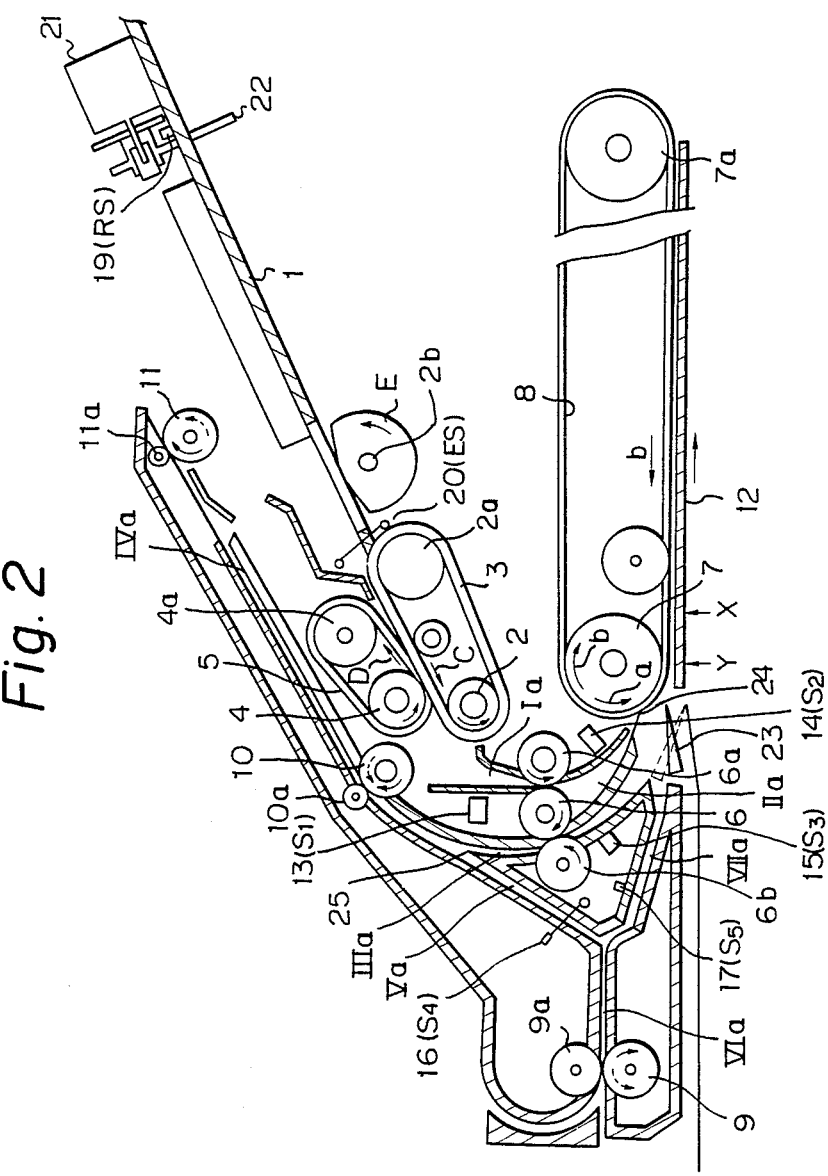
FIG. 2 is a magnified cross-sectional view of said document feeder.
Figure 3A:
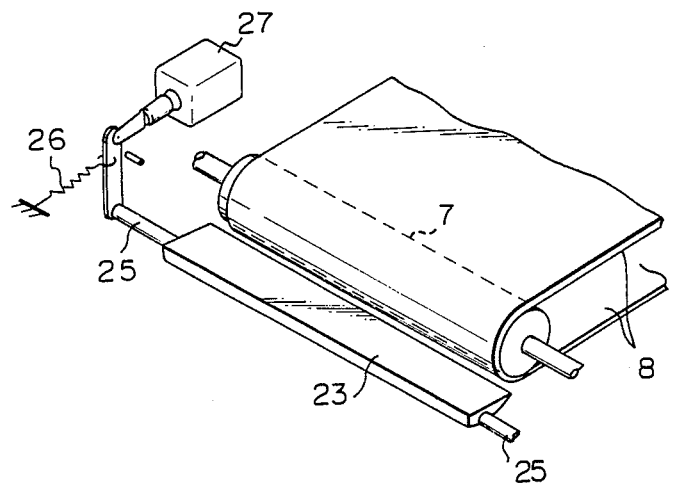
FIG. 3(a) is a perspective view of a movable deflector plate.
Figure 3B:
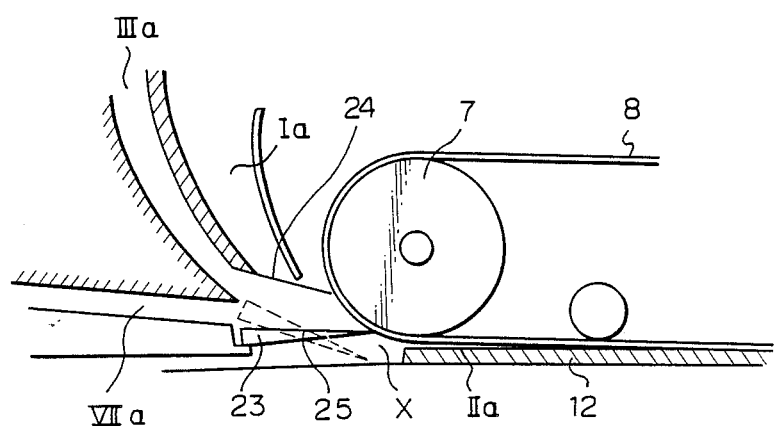
FIG. 3(b) is a lateral view thereof.
Figure 4A:
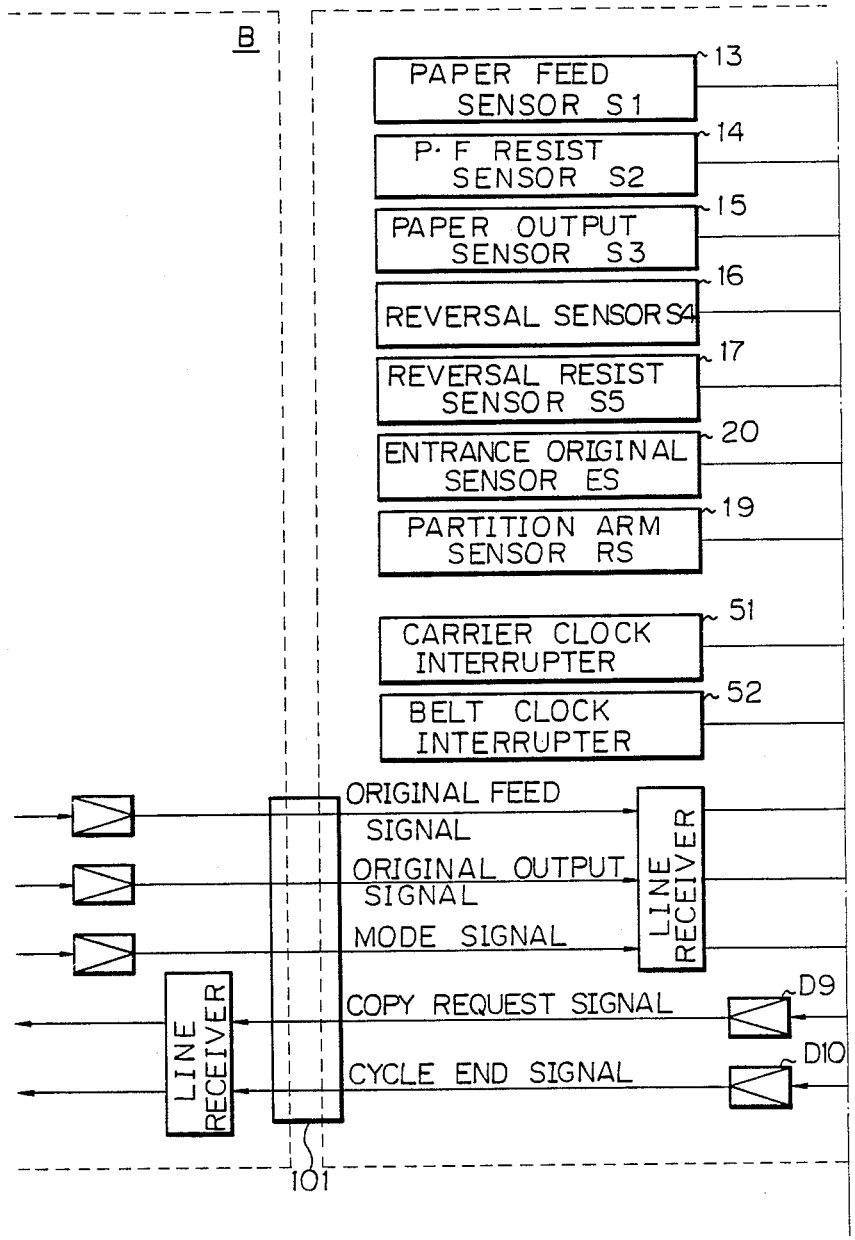
FIGS. 4(a) and 4(b) are block diagrams of a control circuit.
Figure 4B:
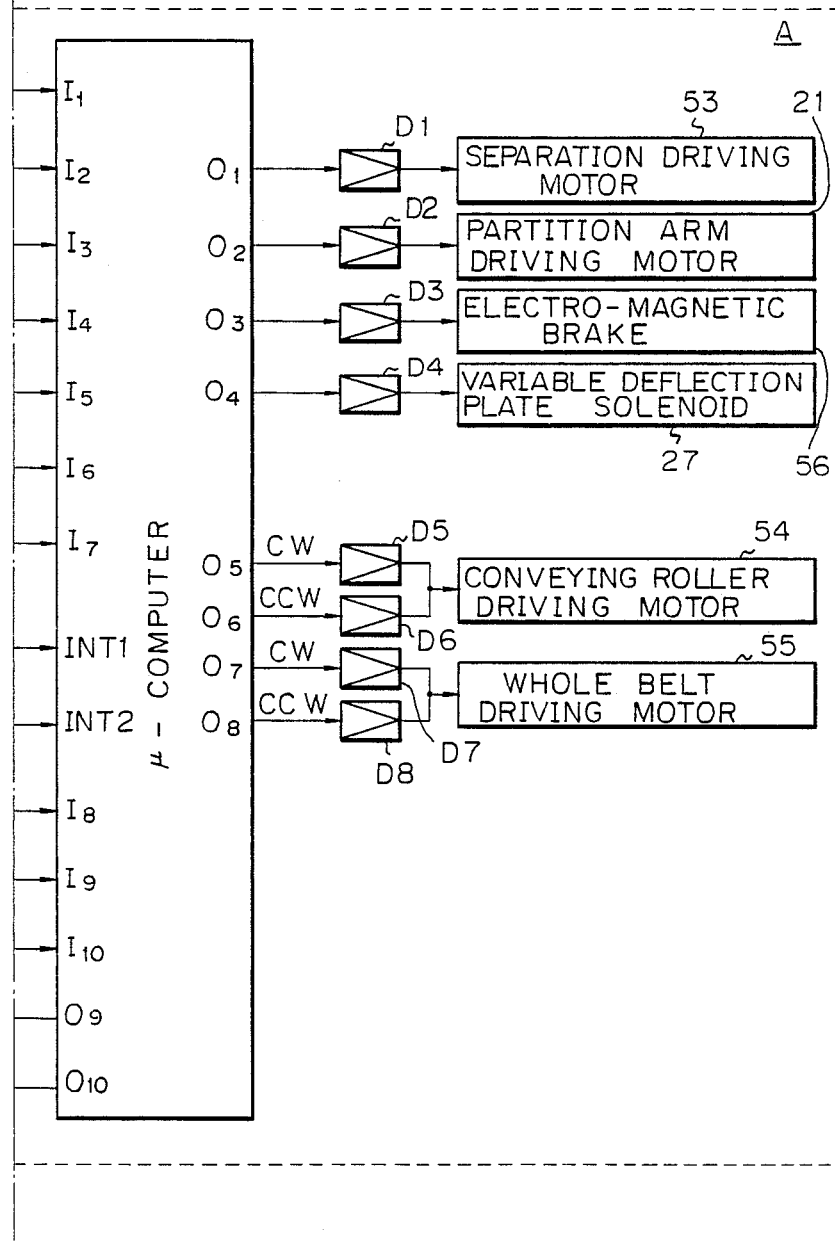

FIG. 1(a) is an external perspective view of a document feeder embodying the present invention and mounted on a copier; FIG. 1(b) is a cross-sectional view thereof; FIG. 2 is a magnified cross-sectional view of said document feeder; FIG. 3(a) is a perspective view of a movable deflector plate; and FIG. 3(b) is a lateral view thereof.

Said automatic document feeder is capable of functioning in a one-side original/one-side copying mode, a one-side original/two-side copying mode, a two-side original/one-side copying mode, or a two-side original/two-side copying mode.

Stated different, the use of said document feeder in combination with an ordinary copier allows to obtain one-sided copies not only from one-sided originals but also from two-sided originals. Also the use of said document feeder with a two-side copier allows to obtain two-sided copies or one-sided copies from two-sided originals.

In the following description it is assumed that the illumination and exposure process is conducted on the bottom face of an original document fed onto the platen glass. A one-sided original document bears image only on the first face thereof, while a two-sided original document bears images on both faces thereof. Also a one-side copying operation means an image forming operation only on the first face of a copy sheet, but not on the second face thereof, while a two-side copying operation means an image forming operation on both faces of a copy sheet. In the following outlined are the above-mentioned operation modes.

A. One-sided original/one-sided copying mode

In case the one-sided original documents are stacked with the image-bearing faces thereof upwards on a stacker tray, said documents are fed with inversion, whereby the image-bearing first face of each document is positioned downward on the platen glass, and the image forming apparatus (hereinafter simply called copier) performs a one-sided copying operation for said image. The document is discharged with inversion, whereby it is returned to the stacker tray with said first face upward, as in the original state.

In case the one-sided original documents are stacked with the image-bearing faces thereof downwards on the stacker tray, the feeding and discharge thereof are conducted without inversion.

B. One-sided original/two-sided copying mode:

The feeding and discharge of the original are conducted in the same manner as explained in the foregoing section A. A two-sided copy is obtained by copying the image of a one-sided original document on a first face of a copy sheet, then copying the image of a succeeding one-sided original document on a second face of said copy sheet.

C. Two-sided original/one-sided copying mode:

In case two-sided original documents are stacked on the stacker tray in the order of pages, an original document is fed with inversion whereby the last page thereof is placed downward on the platen glass and the image on said page is copied in the copier on a first face of a copy sheet. In this manner a one-sided copy is obtained from the first face of the two-sided original.

Then the original on the platen glass, with the first face thereof downwards, is fed again with inversion, whereby the immediately preceding page of said original is placed downwards on the platen glass and the image on said page is copied in the copier on a first face of a succeeding copy sheet. In this manner a one-sided copy is obtained from the second face of said two-sided original. The original is then discharged with inversion, whereby it is returned to the stacker tray with the original order of pages.

D. Two-sided original/two-sided copying mode:.

The feeding and discharge of the originals are conducted in the same manner as explained in the foregoing section C, but the copying operations for the first and second faces of a two-sided original document are conducted on the first and second faces of a same copy sheet in succession. In this manner a two-sided copy is obtained from a two-sided original document.

In this manner the document feeder of the present invention enables automatic image formation in the above-mentioned modes A to D.

In the following there will be given a detailed explanation on a document feeder A while making reference to the attached drawings. At first there will be explained an electrophotographic copier 100 on which said document feeder A can be mounted.

In the drawings there are shown a platen glass 12; a photosensitive drum 330 rotated in a direction of arrow about a shaft 330a; a charger 331; a developing unit 332; a transfer charger 333; a cleaner unit 334; a cassette 335 for storing copy sheets; a feed roller 336 for separating a copy sheet from the cassette; registration rollers 337, 337a; a conveyor belt 338 for advancing a copy sheet, after image transfer, to fixing rollers 339, 339a; an intermediate tray 340 for storing copy sheets after one-sided copying; driving and idler shafts 341, 341a for a conveyor belt 342; driving and idler shafts 343, 343a for a separating belt 344 for re-feeding the copy sheets stored in the intermediate tray 340; and discharge rollers 345, 345a for discharging the copy sheet after copying operation either to a tray T or to the bins of an unrepresented sorter when it is connected.

The copy sheet moves in the following manner. In the one-sided copying operation, a copy sheet released from the cassette 335 reaches an image transfer station F by means of the registration roller 337, 337a in synchronization with a visible toner image formed on the photosensitive drum 330, and receives the image transfer from said drum 330. After said image transfer, the copy sheet is transported through a path IIb by the conveyor belt 338 to reach the fixing rollers 339, 339a for fixing thus transferred image, and is then discharged by the discharge rollers 345, 345a onto the tray T through a path VIIIb.

In case of the two-sided copying operation, a guide member 48 is shifted to a chain-lined position, whereby the copy sheet, bearing a transferred image on a face thereof, is guided to a path IIIb after passing the fixing rollers 339, 339a. The sheet is inverted in said path IIIb and is stored in the inverted state in the intermediate tray 340. The copy sheets held on said intermediate tray 340 are separated one by one by the belts 342, 344 and advanced to a path VIb. The copy sheet on said path VIb is fed to the image transfer station F by the registration rollers 337, 337a in synchronization with the image on the drum 330 to receive the image onto a second face of the sheet. The transferred image is fixed through the path IIb, and the copy sheet bearing completed images on both faces is discharged onto the tray T.

Now there will be given an explanation on the document feeder A. As shown in FIGS. 1(a), 1(b) and 2, a stacker tray 1, for supporting the original documents, is provided in a tilted position down toward the feeding direction. Consequently the original documents are aligned at an edge close to the feeding direction. A crescent-shaped roller 2b, rotated in a direction E for advancing the documents toward a downstream separating station, is so controlled as to stop with the notched portion thereof upward when no documents are present on the stacker tray 1. Feed rollers 2, 2a rotate a feed belt 3 in a direction C for feeding the documents from the stacker tray 1. Separating rollers 4, 4a rotate a separating belt 5 in a direction D to separate, in cooperation with the feed belt 3, a lowermost one of the original documents on the stacker tray 1. Thus said feed belt 3 and said separating belt 5 constitutes a separation-feed station.

First sheet paths Ia, IIa are used for moving the document, separated in said separation-feed station, to the platen glass 12. Said sheet path Ia is formed as an arch between said station and an end of the platen glass 12 and serves to guide the document from the feed belt 3, after inversion, onto the platen glass 12.

Second sheet paths IIIa, IVa are used for moving the document from the platen glass 12, after inversion, to the stacker tray 1. Said second sheet paths IIIa, IVa are positioned facing said first sheet paths Ia, IIa and extend from an end of the platen glass 12 to a position above the separating belt 5 through the outside of the sheet path Ia.

Third sheet paths Va, VIa, branching from said second sheet paths IIIa, IVa to form a switch-back, are used for inverting two-sided original documents. The path VIa is formed by arch-shaped guide members which invert an original document advanced in the approximately horizontal direction along the path Va and exposes a part of said document in an upward arch form to the outside through an aperture, thereby allowing the operator to confirm the upward exposed face of the document which is to be fed next to the platen glass 12.

A fourth sheet path VIIa, branching from the third sheet paths Va, VIa to form a switch-back path, is provided for inverting a two-sided originals by switch-back operation from said paths Va, VIa to the platen glass 12.

Transport rollers 6, 6a advance the original toward the platen glass 12 along the sheet paths Ia, IIa, while transport rollers 6, 6b advance the original toward the stacker tray 1 along the sheet paths IIIa, IVa. Roller pairs 10, 10a and 11, 11a advance the original from the platen glass 12 toward the stacker tray 1 and then are reversed to switch the original from the second sheet paths IIIa, IVa to the third sheet paths Va, VIa. Another roller pair 9, 9a guides the original, advancing along the third sheet paths Va, VIa to a path for exposing a part of said original to the outside, and are reversed after a temporary stop to switch said original to the fourth sheet path VIIa. A flexible deflector plate 24 is so positioned that the front end thereof is in contact with or slightly apart from the conveyor belt 8, whereby the original coming through the first sheet paths IA, IIa can proceed toward the platen glass 12 while the original from said platen glass 12 is securely guided into the sheet path IIIa by said front end which is contact with or close to the belt 8. In this state a movable deflector plate 3 is in a chain-lined position to advance the original to the second sheet path IIIa. A flexible deflector plate 25, similar to 24, is provided on a guide member, whereby the original advancing along the sheet path IIIa can pass through said deflector plate 25 while the original coming from the second sheet path IIIa is securely guided into the path Va by said deflector plate 25. For the following description, reference is to be made to FIGS. 3(a) and 3(b). The above-mentioned movable deflector plate 23 is positioned at the merging point of the first sheet path Ia, second sheet path IIIa and fourth sheet path Va at the left-hand end of the platen glass 12, and is rendered rotatable about a shaft 28, parallel to the driving roller 7 of the belt 8. Said deflector plate 23 is normally biased upwards by a spring 26 and is supported by a stopper of the guide member, but is rotated downwards to a chain-lined position when a plunger 27 is energized. In said chain-lined position, the deflector plate 23 securely guides the original document, which is discharged from the platen glass 12 after being fed thereto through the first sheet paths Ia, IIa, to the second sheet path. On the other hand, in the full-lined position, it securely guides the original document from the fourth sheet path VIIa to the platen glass 12. The deflector plates 24, 25 are composed of flexible sheets such as of mylar or stainless steel.

Driving and idler rollers 7, 7a rotate the conveyor belt 8 substantially covering the entire width of the platen glass 12 either in the forward direction to feed an original document onto said platen glass 12 or in the reverse direction to discharge the original document from said platen glass 12.

In the following there will be explained sensors employed in the present embodiment. A transmission sheet sensor 20, or ES, is provided at the front end of the stacker tray 1, in order to detect the presence of the original document thereon. A transmission first sheet sensor 13, or sheet feed sensor S1, is positioned in the first sheet path Ia between the separation-feed station and the feed rollers 6, 6a. A second sheet sensor 14, or sheet registration sensor S2, is provided in the first sheet path IIa between the feed rollers 6, 6a and the left-hand end of the platen glass 12. A third sheet sensor 15, or sheet discharge sensor S3, is positioned in the third sheet path IIIa between the left-hand end of the platen glass 12 and the feed rollers 6, 6b. A fourth sheet sensor 16, or sheet inversion sensor S4, is positioned in the third sheet path Va. A fifth sheet sensor 17, or inversion registration sensor S5, is positioned in the fourth sheet path VIIa between the rollers 9, 9a and the platen glass 12. These first to 5th sheet sensors S1-S5 detect the leading or trailing end of a sheet passing through the position of said sensors.

A reflective sensor 19, or recycle sensor RS, is provided for detecting a complete circulation of the stack of the original documents. Said recycle sensor 19 is turned off when a partition arm 22 is placed on the stack of originals by means of a recycle motor 21. The originals are fed one by one from the bottom of said stack, and, when the trailing end of the last original is pulled off from said partition arm 22, said arm spontaneously falls by the weight thereof to pass the position of said recycle sensor 19, thus activating said sensor.

In FIG. 2, an unrepresented separation motor drives the feed rollers 2, 2a, crescent-shaped roller 2b and separating rollers 4, 4a, thus driving the feed belt 3 in the direction C, separating belt 5 in the direction D and crescent-shaped roller 2b in the direction E.

Figures 1, 9:
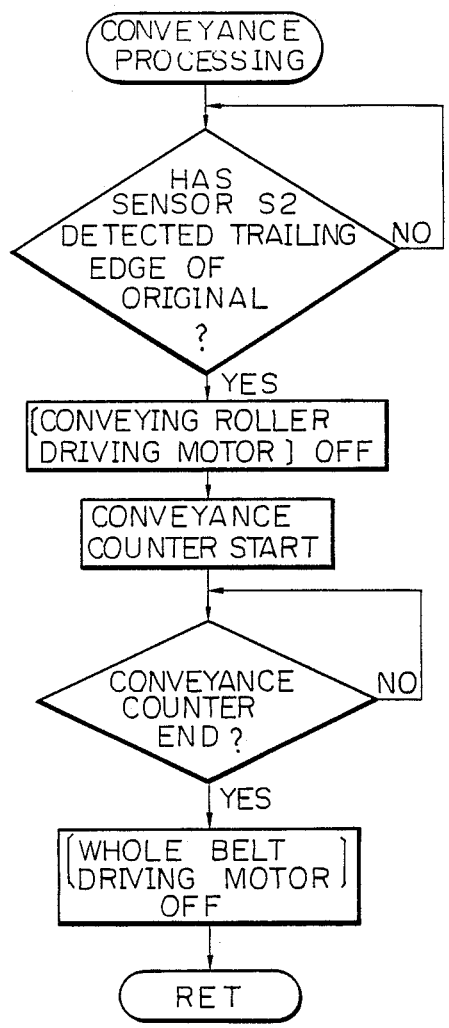
Figures 2, 9:
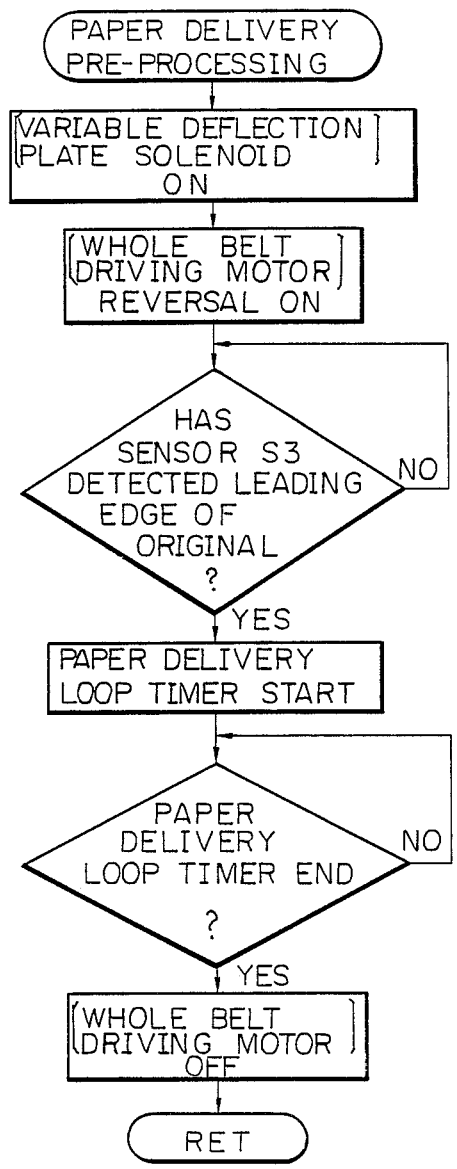
Figures 3, 9:
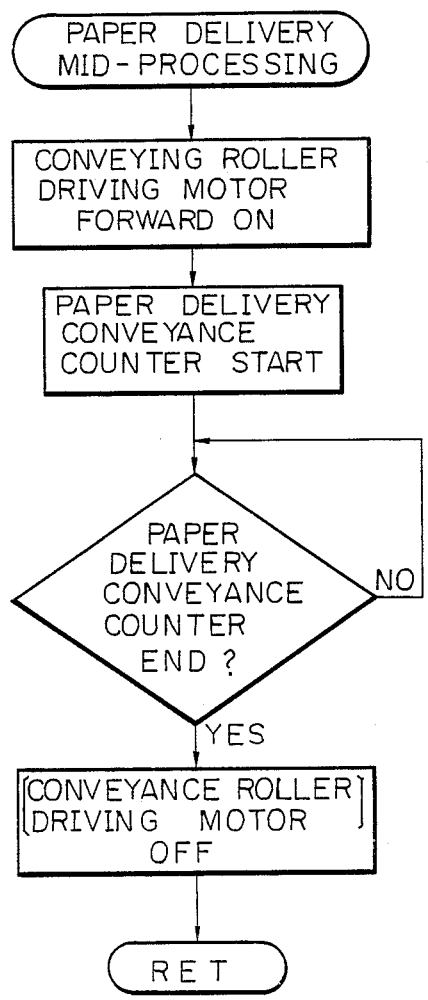
Figures 4, 9:
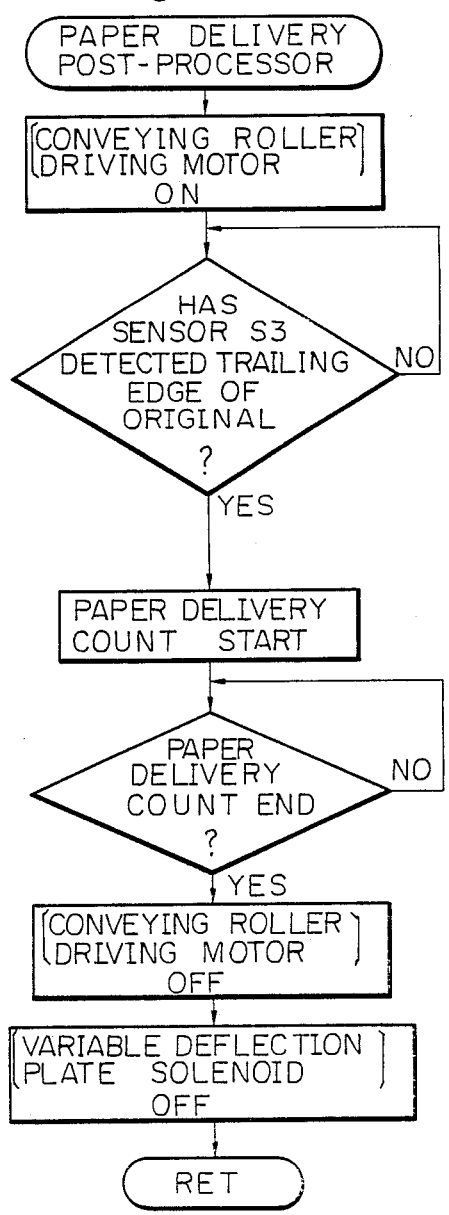
Figure 10B:
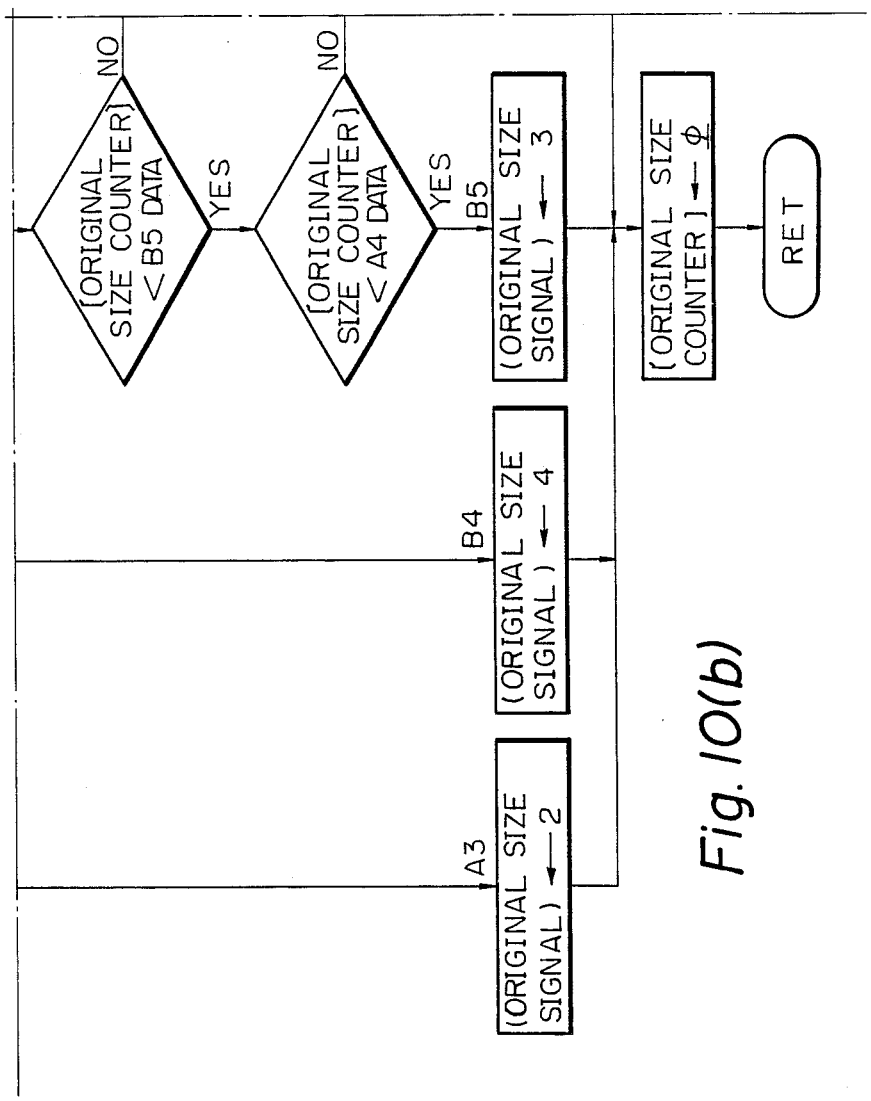
Figure 10C:
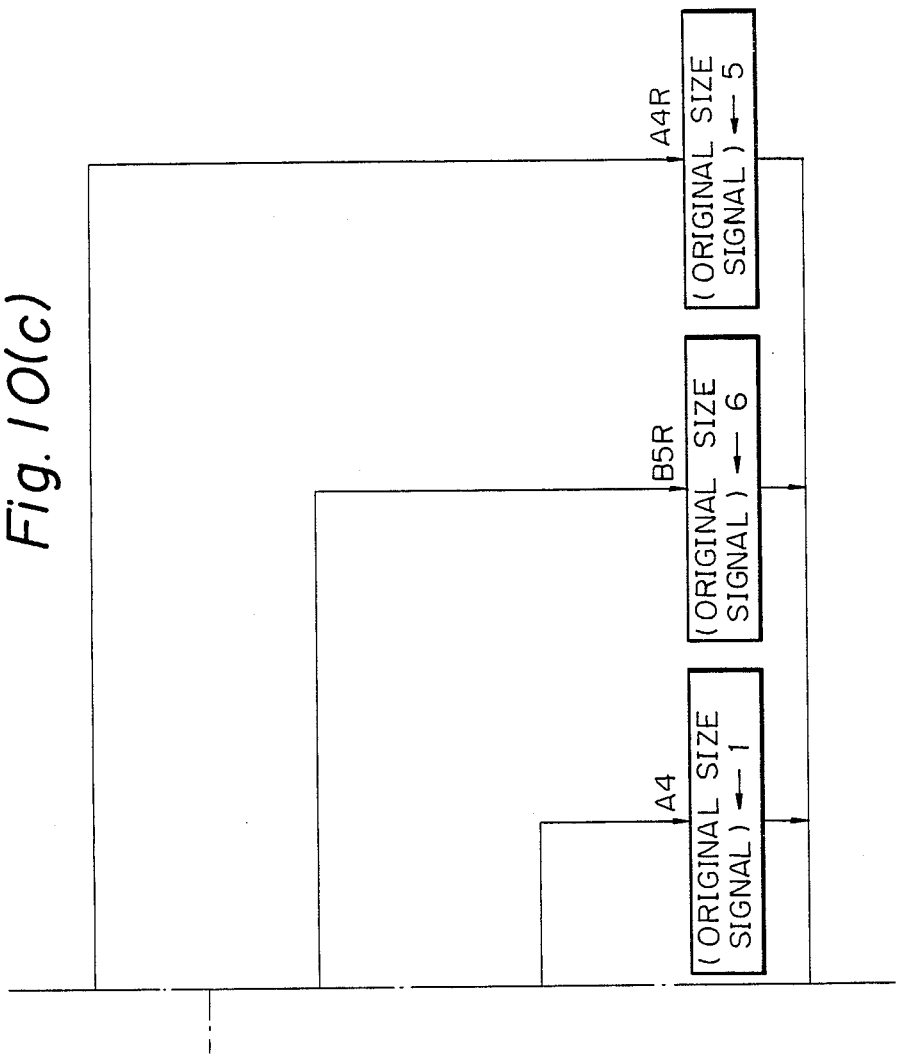

A roller driving motor 54, shown in FIG. 4, can be rotated in both directions and is used for driving the rollers 6, 6a, 6b, 10, 10a, 11, 11a, 9 and 9a either in a direction of full-lined arrow in the forward or clockwise rotation, or in a direction of broken-lined arrow in the reverse or counterclockwise rotation. For detecting the revolution of said motor, there are provided an unrepresented clock disk mounted on the shaft thereof and a clock interrupter sensor 51 shown in FIG. 4.

A belt driving motor 55, shown in FIG. 4, can be rotated in both directions and is used for driving the belt 8 through the driving roller 7, either in a direction of arrow a in the forward or clockwise rotation or in a direction of arrow b in the reverse or counterclockwise rotation. On the shaft of said motor there is provided an electromagnetic brake 56, shown in FIG. 4, for precisely stopping said shaft, and there is further provided an unrepresented clock disk for detecting the revolution of said shaft in combination with a belt clock interrupter sensor 51 shown in FIG. 4.

FIG. 4 is a block diagram showing a control circuit for executing sequence operation in the present embodiment. Said control circuit is principally composed of a known one-chip microcomputer incorporating ROM, RAM, etc., and executes the desired control through signal exchange with a controller of the copier 100.

Input ports I1-I7 of said microcomputer respectively receive signals from the aforementioned sheet sensors S1-S5 positioned on various sheet paths, a signal from the original sensor ES (20) positioned outside the stacker tray 1, and a signal from the recycle sensor RS (19) detecting the descent of the partition arm 22. Also interruption ports INT1, INT2 of said microcomputer respectively receive signals from the aforementioned interruptors 51, 52 for detecting the revolution of motors in combination with clock disks mounted on the shafts of said motors, and said signals are respectively counted in the microcomputer as reference clock signals indicating the amount of sheet feed. Output ports O1-O8 of the microcomputer respectively release signals for activating the aforementioned separating motor 53, partition arm driving motor 21 for moving the partition arm 22, solenoid 27 for the aforementioned deflector plate and electromagnetic brake 56, signals CW, CCW for driving the feed roller driving motor 54 respectively in the forward and reverse directions, and signals CW, CCW for driving the belt driving motor 55 respectively in the forward and reverse directions. The abovementioned signals are used for turning on or off respective loads through drivers D1-D8. The signal exchange between the document feeder A and the copier B is conducted through a cable 101, and input ports I8-I10 of said microcomputer respectively receive an original feed signal, an original discharge signal and a mode signal, while output ports O9, O10 thereof respectively release a copy request signal and a cycle end signal through drivers D9, D10. These signals will be further explained later.

The intake of these input signals and the on/off operation of the loads are controlled by a program stored in the read-only memory (ROM) of the microcomputer.

Figure 11:
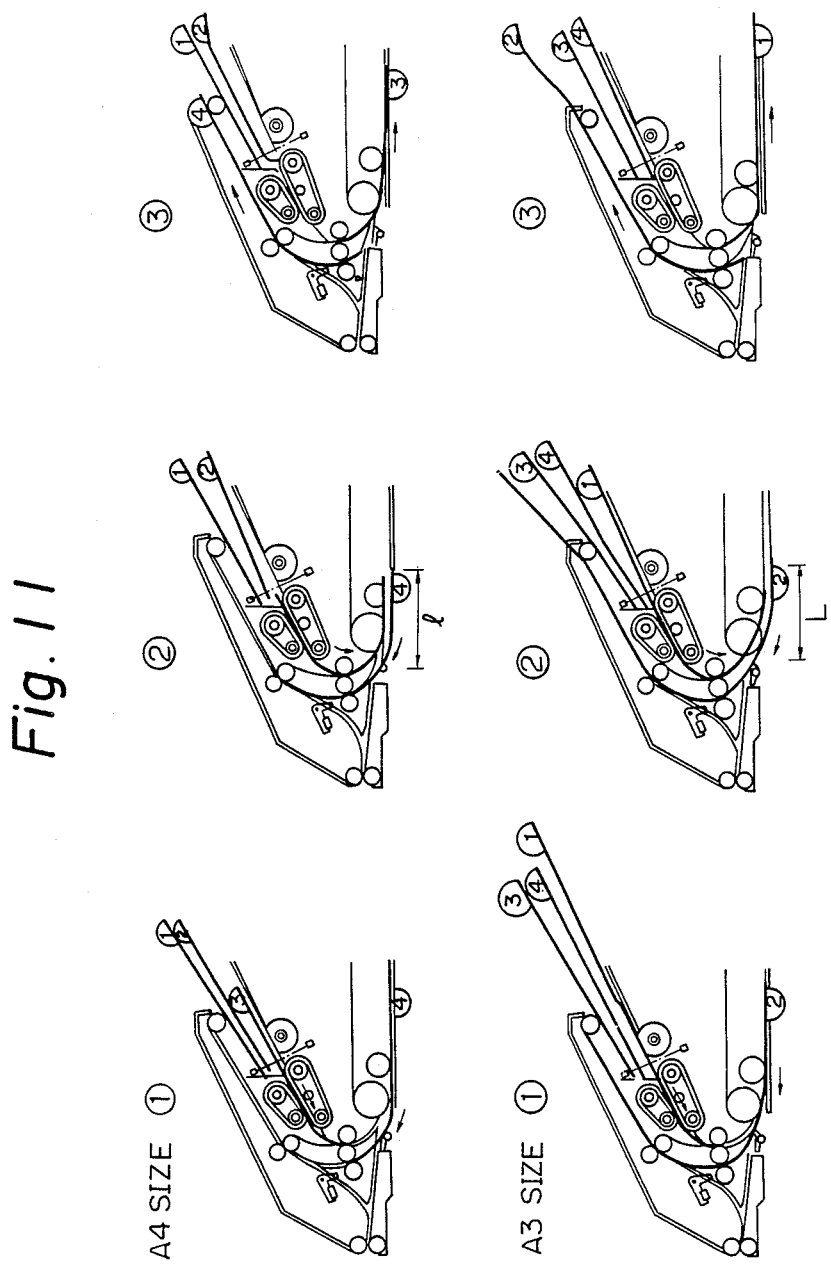
Figure 12:
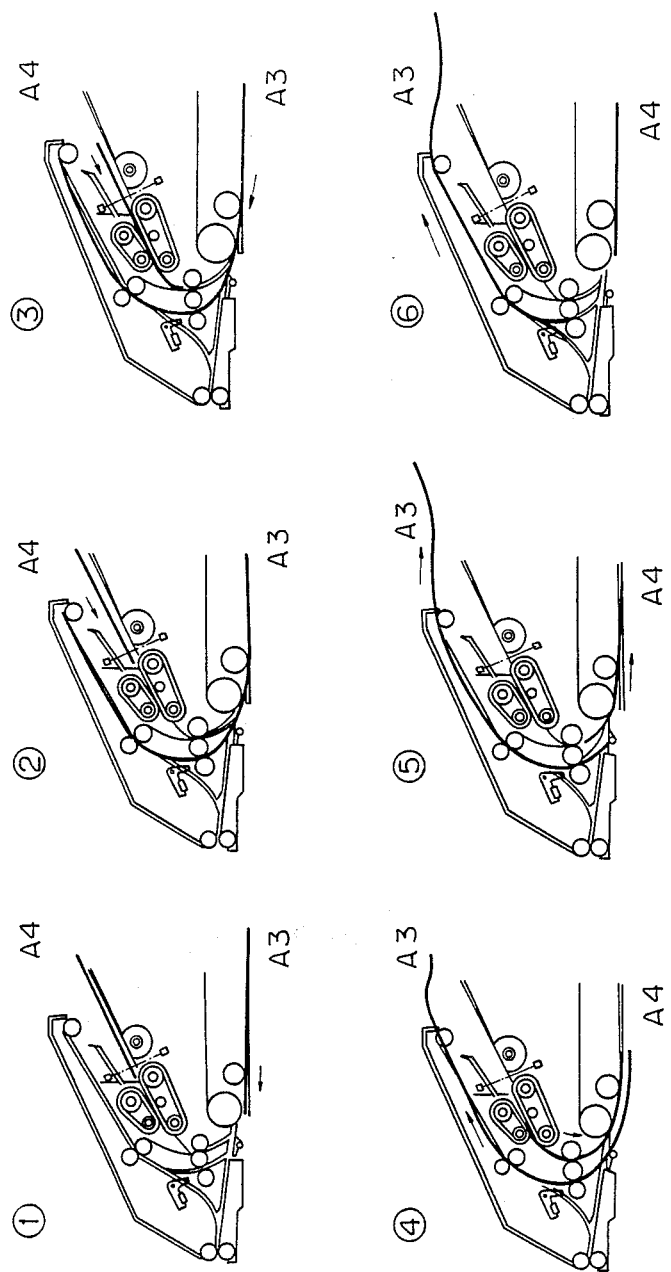

Now there will be given an explanation on the function of the present embodiment, while making reference to program flow charts shown in FIGS. 5 to 10 and schematic drawings shown in FIGS. 11 to 13.

A. Operation with one-sided originals (case of obtaining two copies from each of 4 originals)

As a specific example there will be explained a case, as shown in FIG. 13, of obtaining two one-sided or two-sided copies from each of four one-sided original documents numbered from page (1) to (4). At first said one-sided originals are placed on the stacker tray 1 and are detected by the original sensor ES (20).

Then copying conditions, such as the selection of one-sided originals, of two copies, of one-side or two-side copying mode etc. are entered through an unrepresented operation panel of the copier 100, and a copy start button of said panel is actuated, whereupon a one-side mode is designated.

In response to the actuation of the copy start button there is initiated a program for one-side mode process shown in FIG. 5 in the following manner (1) At first the partition arm driving motor 21 is activated for a period of 200 ms, in order to place the partition arm 22 on the uppermost one of the original documents stacked on the stacker tray 1. Thus the partition arm sensor RS (19) is turned off, whereby turned of is the cycle end signal informing a circulation of the originals to the copier 100 (Step 1);

(2) The program then proceeds to Step 2 for a separation process, in which the separating motor 53 is activated to separate the lowermost original of page (4) from the stacked originals. A separation loop timer is activated when the sheet feed sensor S1 detects the front end of the original proceeding in the sheet path Ia, and the separating motor 53 is deactivated at the expiration of said timer, whereby said original is stopped with a determined amount of loop after the front end thereof reaches the nip of the feed rollers 6, 6a. Said loop formation has an effect of correcting skewed feeding eventually developed at the sheet separation. (cf. FIG. 7-1).

(3) In a succeeding Step 3 for sheet feeding, the driving motor 54 is activated in the forward direction to drive the feed rollers 6, 6a thereby advancing the original document from the sheet path Ia to IIa, then the belt driving motor is activated in the forward direction when the front end of the original document is detected by the registration sensor S2 in the sheet path IIa thereby feeding said original document onto the platen glass 12, and an original size counter is activated to count the clock pulses entered from the clock interruptor 51, thus initiating the measurement of the original size. Said original size counter is deactivated when the rear end of the original document passes the sheet feed sensor S1, and the obtained count is processed in a subroutine SIZECK SUB shown in FIG. 10 to determine the size of the original document (cf. FIG. 7-2).

Figures 1, 7:
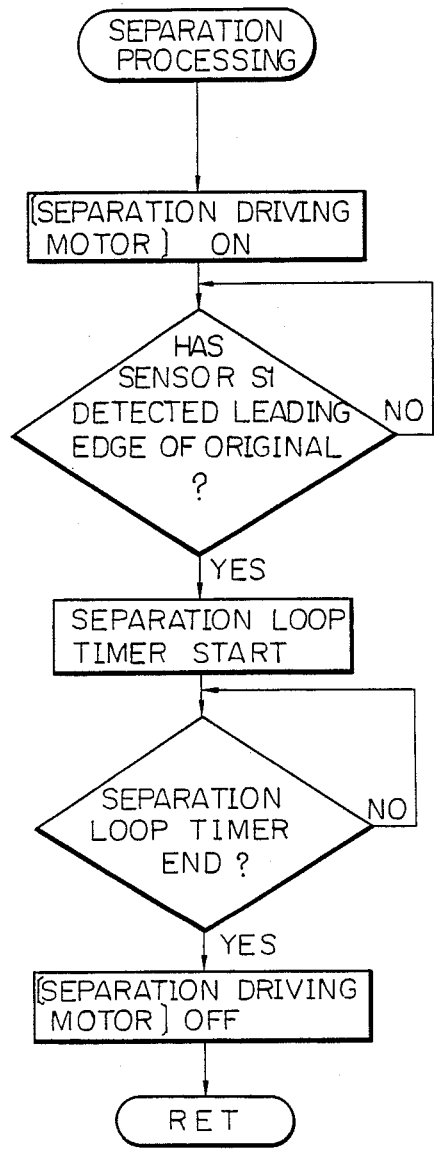
Figures 2, 7:
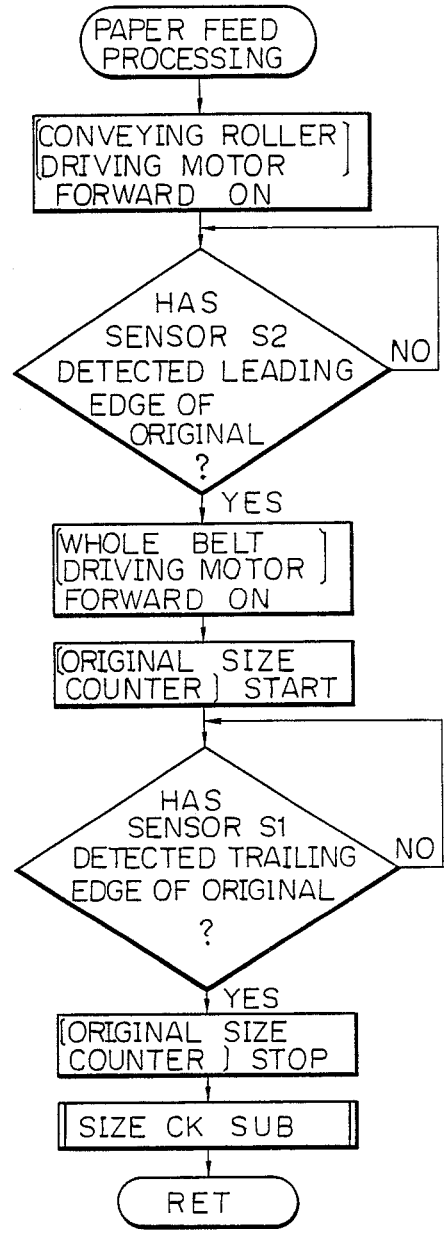

As explained above, the pulse counting operation for size determination is initiated by detecting the front end of the original document with the registration sensor S2 and terminated by detecting the rear end with the sheet feed sensor S1. Thus, the size determination in said subroutine SIZECK SUB shown in FIG. 7-2 is achieved by adding a correction for the distance between said registration sensor S2 and sheet feed sensor S1. Since the original document is advanced by the feed rollers 6, 6a alone, the number of pulses from the clock interruptor is exactly proportional to the amount of feeding. The original size, such as B5, A4, A4R, B5R, B4 or A3 determined by the above-mentioned correction, is used as a reference for determining the count of a sheet discharge transport counter to be explained later.

Said original size is also supplied to the copier for use, for example, in the automatic selection of the copy sheet cassette.

The distance between the sheet feed sensor S1 and the registration sensor S2 is therefore selected smaller than the size of the smallest possible original document.

Figures 3, 7:
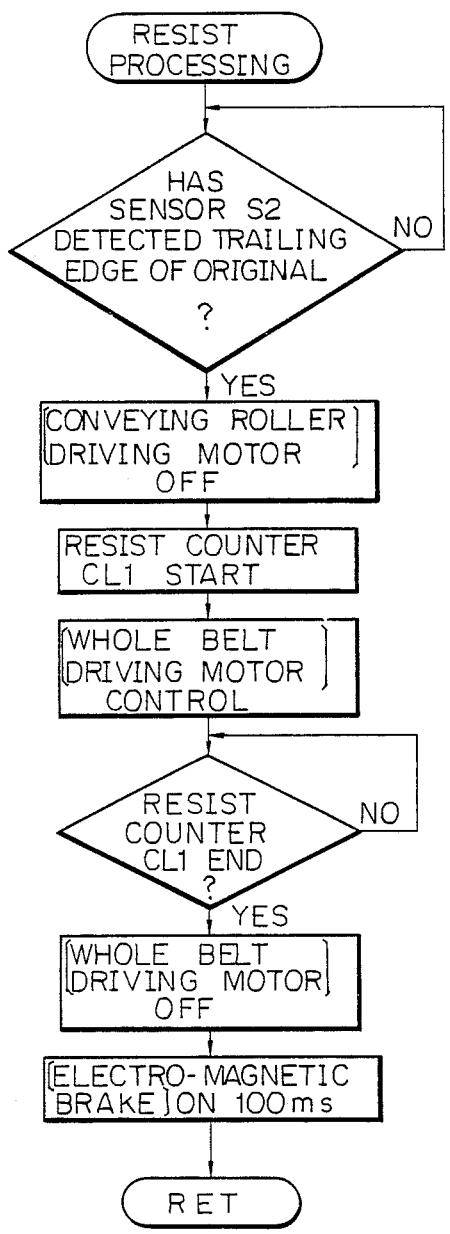
Figures 1, 8:
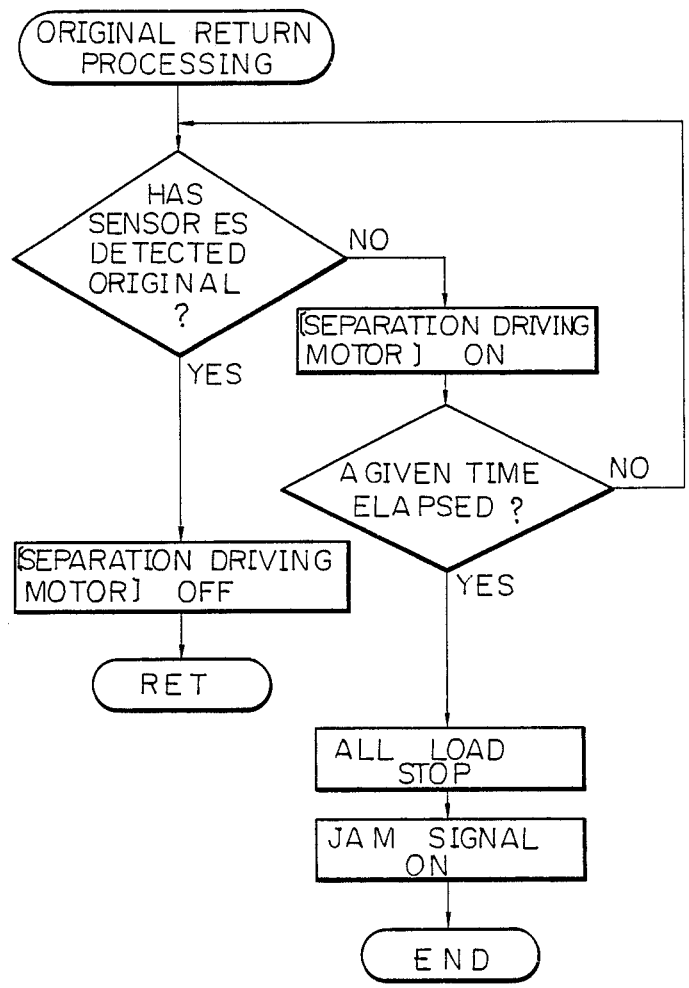
Figures 2A, 8:
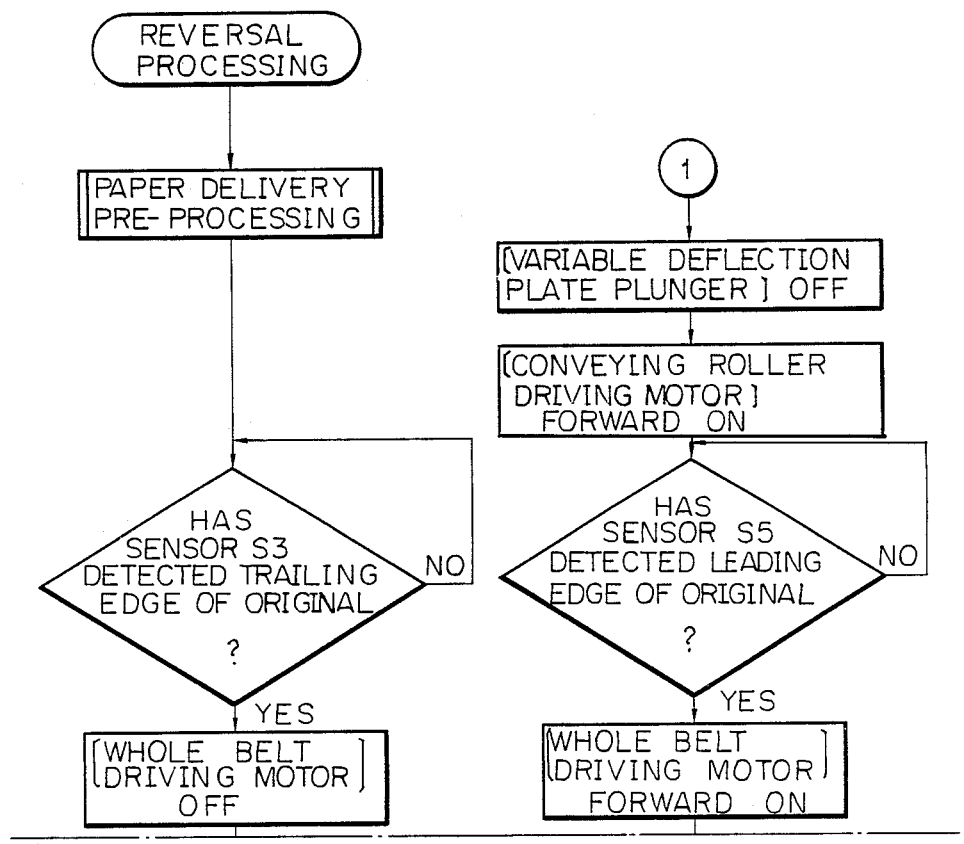
Figures 2, 8:
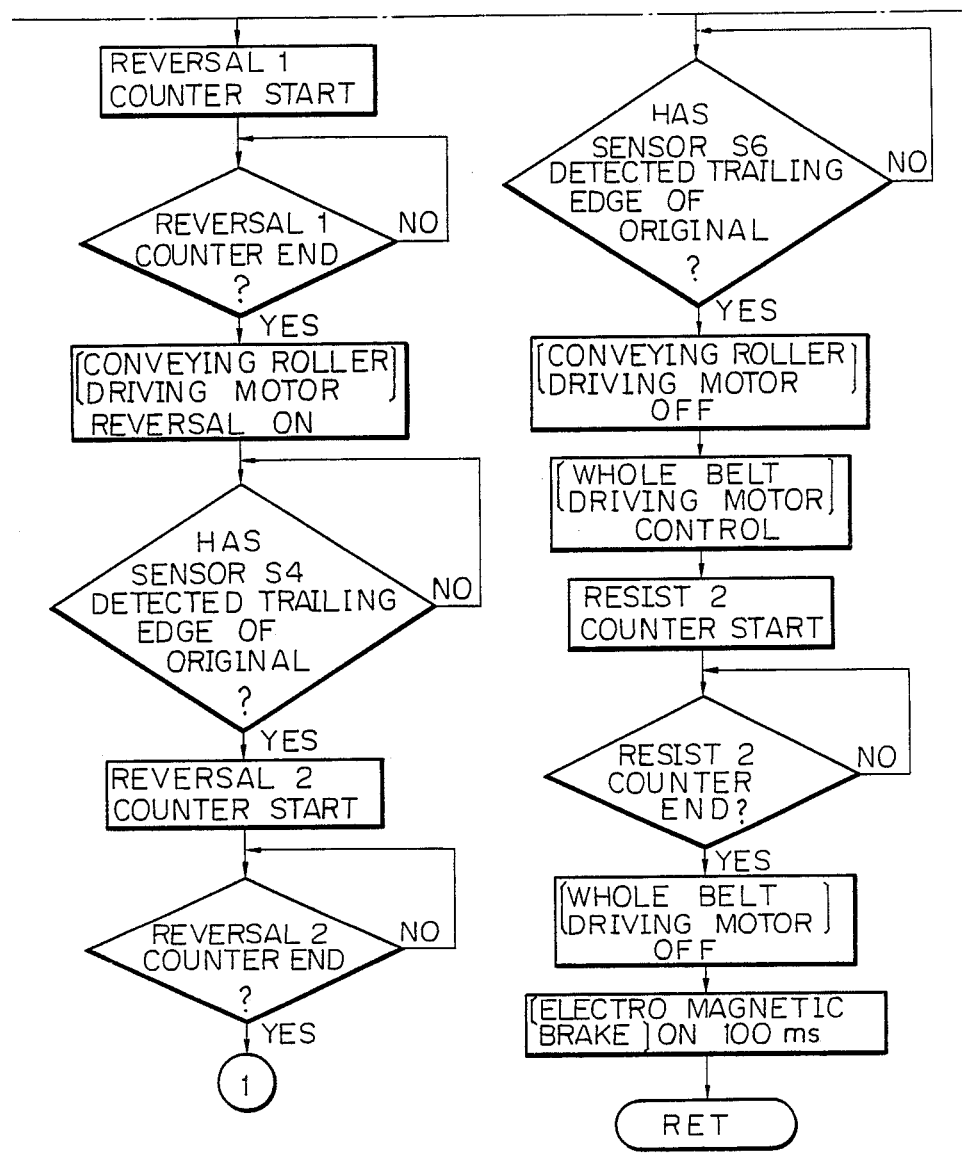

(4) In a succeeding Step 4 for original registration, the driving motor 54 is deactivated and a registration counter CL1 for stopping the original document at the exposure position on the platen glass 12 is activated when the registration sensor S2 detects the rear end of the original document moving from the sheet path IIa onto the platen glass 12. When said registration counter CL1 expires, the belt driving motor 55 is turned off and the electromagnetic brake 56 is activated for 100 ms whereby the original document reaches the exposure position X on the platen glass shown in FIG. 2. A constant stop at the exact position is achieved by decelerating the belt driving motor 55 during the counting operation of the registration counter CL1 and by instantaneously stopping the original document with the electromagnetic brake 56 (cf. FIG. 7-3).

(5) In a Step 5, a copy request signal is supplied to the copier, which in response temporarily interrupts the original feed signal and activates the optical system, whereby an exposure and copying process is conducted for the page (4) of the original document which is now placed on the platen glass 12. In case the one-side copy mode is selected in advance, an image corresponding to said page (4) is formed on a first face of the copy sheet, which is then discharged, with thus formed image upwards, onto the tray T shown in FIG. 1(b). On the other hand, in case of a two-side copying mode, the copy sheet is not discharged to said tray T but is fed to a re-feed mechanism 40 in the copier.

(6) In a succeeding Step 6, there is identified, as will be explained later, if a discharged original document is in transport. Since the first original is handled in this state, no discharged original in transport is identified and the program proceeds to Step 8.

(7) During the exposure process in the copier 100, the program proceeds to the Step 8 to identify whether the aforementioned partition arm 22 has descended to activate the recycle sensor 19, indicating the completion of the feeding of originals for the first copies. In the present state where the page (4) is handled, the recycle sensor 19 remains still off (Step 8). Then there is identified, according to the aforementioned original size determination, whether the original document of page (4) is larger than B4 size (Step 9), and the ensuing control procedure is modified according to the result of said identification.

(8) In case the page (4) is smaller than B4 size, the aforementioned separation process of Step 2 is executed prior to the completion of the exposure process for the page (4), whereby the succeeding original document of page (3) is stopped in a looped state with the front end thereof at the nip of the feed rollers 6, 6a. Then the program proceeds to a Step 10 in which the original feed signal is turned on and the copy request signal is turned off when the exposure process for the page (4) is completed. These functions are conducted in the following manner (8-1) In this state there is effected an original exchange operation in which the page (4) is discharged simultaneously with the feeding of the page (3). At first the program proceeds to a Step 11 for a preprocess for discharging the page (4), in which the solenoid 27 is energized to shift the movable deflector plate 23 to the chain-lined position shown in FIG. 2, thus forming a passage from the platen glass to the sheet path IIIa, and then the belt driving motor 55 is activated in the reverse direction to advance the original document of page (4) to said sheet path IIIa. A sheet discharge loop timer is activated when the sheet discharge sensor S3 detects the front end of said original, and, upon expiration of said timer, the belt driving motor 55 is deactivated whereby the original is temporarily stopped in a state with a determined amount of loop and with the front end at the nip of the feed rollers 6, 6b. This looped state has an effect of correcting a skewed feeding eventually developed in the course of sheet discharge (cf FIG. 9-2).

Figure 5B:
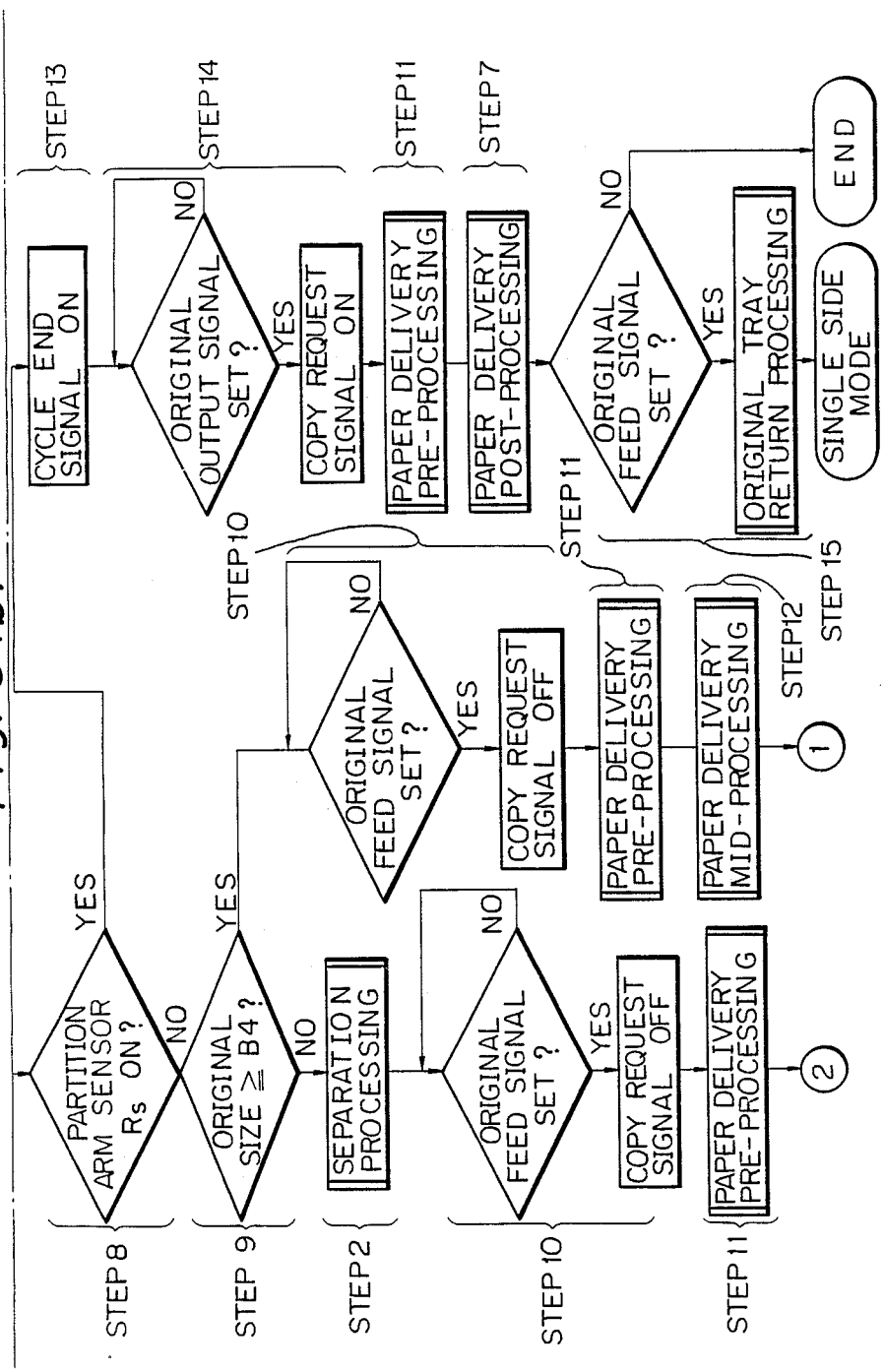

(8-2) Then the program returns to a point (2) in FIG. 5 to execute the aforementioned original feeding of the Step 3 whereby the feed rollers 6, 6a hold the succeeding original of page (3) while the feed rollers 6, 6a hold the discharged original of page (4). The original of page (3) is fed through the sheet paths Ia and IIa while the original of page (4) is discharged from the platen glass through the sheet paths IIIa and IVa.

The original of page (3), which is advanced to the platen glass 12 by the forward rotation of the feed rollers 6, 6a, enters a gap, from the left-hand end of the platen glass 12, between the belt 8 in forward rotation and the already exposed original of page (4) transported in opposite direction along the glass platen 12, and is transported toward the right-hand end of said glass platen 12 by means of the frictional force of the belt 8, thus sliding on the oppositely moving original of page (4). On the other hand, though said exposed original of page (4) still remaining on the glass platen 12 receives the transporting force to the right, the feed rollers 6, 6b exert a stronger transporting force and extract the original of page (4) from between the platen glass 12 and the succeeding original of page (3). The above-explained sheet movements are illustrated in FIG. 11.

(8-3) Then the program executes the registration process of Step 4 and turns on the copy request signal in Step 5, thereby setting the original document of page (3) at the exposure position on the platen glass and initiating the copying operation in the copier. On the other hand a post-process for discharged original in Step 7 us executed for the discharged original of page (4), in which an original discharge counter is activated upon detection of the rear end of said original by the sheet discharge sensor S3, and said original reaches the top of the stacked originals through the sheet path IVa upon expiration of said counter and is placed on the partition arm 22. Then the driving motor 54 and the solenoid 27 are deactivated to complete the original discharging operaiton (cf. FIG. 9-4).

(9) In the copier there is executed an exposure and copying process for the original of page (3) now set on the platen glass 12, with the image bearing face downwards. In case the one-side copy mode is selected in advance, an image corresponding to said page (3) is formed on a first face of the copy sheet, which is then discharged, with thus formed image wards, onto the copy of page (4) already discharged on the tray T.

In the case of the two-side copy mode, the copy sheet already bearing the image of page (4) on the first face thereof is fed from the intermediate tray 340, and the image of page (3), is formed on the second face of said sheet to form a two-sided copy, which is then discharged, with said image of page (3) upwards, onto the tray T. Said copy sheet moves as already explained.

(10) Thereafter the functions in the foregoing sections (7), (8) and (9) are repeated to effect reverse advancement and return of the exposed original document to the stacker tray 1, separation and setting of the lowermost one of the stacked originals on the stacker tray 1 to the platen glass 12 and exposure of the original.

(11) In the following there will be explained the operations in a case of mixed original sizes, in which the originals of pages (4) and (3) are A4 size and those of pages (2) and (1) are A3 size.

When the original of page (2) is set at the exposure position on the platen glass and the copy process for said page is completed through the above-explained operations (7), (8) and (9), the afore-mentioned Step 9 identifies whether the size of the original document is larger than B4 size. In the contemplated case the original document is A3 size which is larger than B4, so that there is executed a following program which is different form the foregoing section (8).

(11-1) In this case, different from the aforementioned case for an A4-sized original, the Step 2 for separating the succeeding original document is not effected. Instead there are executed the Step 10 for awaiting the completion of exposure process, Step 11 for pre-process for sheet discharge and Step 12 for sheet discharge. More specifically the original of page (2) is stopped in a looped state at the feed rollers 6, 6b in said pre-process, and the driving motor 54 and the sheet discharge transport counter are activated and said motor is deactivated at the expiration of said counter in the sheet discharge process, whereby said original document is discharged to and stopped in a position bridging over the platen glass and the sheet paths IIIa and IVa (cf. FIG. 9-3).

(11-2) Then the program returns a point (1) in FIG. 5 to execute the Step 2 for separating the original document of page (1), and the Steps 3 and 4 for replacing the exposed original of page (2) with the succeeding original of page (1) in mutually opposite movements on the platen glass as explained in the foregoing section (8-2). The sheet movements in this case are illustrated in FIG. 11. Referring to FIG. 11(2) showing the flow of sheets of A4 and A3 sizes, satisfactory exchange of originals can be assured regardless of the size thereof, by adjusting the amount of feeding by the sheet discharge transport counter according to the aforementioned size data in such a manner that the length l of counter-movement of two originals remains as a constant amount L. In the foregoing explanation there is only described an exchange of an original of A4 or A3 size with another original of same size, satisfactory exchange between the originals of A4 and A3 sizes is also possible in case the originals of such two sizes are mixedly stacked. (cf. FIG. 12).

(12) When the original of page (1) reaches the exposure position, the aforementioned partition arm 22 descends by the weight thereof to activate the recycle sensor RS, whereby there is executed another program.

In this case a Step 13 is executed to release a cycle end signal, indicating the completion of a cycle of the originals, in response to which the copier identifies that the last original document is positioned for exposure and initiates a sheet discharge operation by releasing an original discharge signal, thereby effecting the discharge of the exposed original alone at the end of exposure process (Step 14).

(13) The last original of page (1) is discharged, by the aforementioned Step 11 for sheet discharge preprocess and Step 7 for sheet discharge post-process, to the uppermost position on the stacker tray 1 through the sheet paths IIIa and IVa from the platen glass.

(14) In the present example, the copier is set to produce two sets of copies which are to be stacked in the order shown in FIG. 13. As one cycle of the originals produces a set of copies, another cycle of the originals is required to produce another set of copies.

The program therefore proceeds to a Step 15 in which, in response to an original feed signal from the copier, an original return process is executed to re-start the circulation of the original documents. At first there is identified whether the entrance original sensor ES is turned on by the originals. If it is turned on, indicating that the originals are properly stacked on the stacker tray 1, the program returns to the one-side mode process in order to initiate the circulation of the original documents. However there may result a case in which the original documents have not returned to the feed slot by some reason, since the original documents are to be stacked by the weight thereof after leaving the sheet path IVa. In such case where the entrance original sensor ES is not turned on, the separating motor 53 is activated for a determined period to drive the crescent-shaped roller 2b positioned downstream of the stacker tray 1, thereby advancing the originals stack on the stacker tray 1 to the feed slot. However, if the entrance original sensor ES is still not turned on after the separating motor has been activated for said determined period, there is identified a completely stack state of the originals on the stacker tray 1. Thus all the loads are deactivated and a JAM signal is released (cf. FIG. 8-1).

(15) In this manner the circulation of the original documents stacked on the stacker tray 1 is automatically repeated twice, equal to the copy number set in the copier, and two sets of one-side or two-side copies are obtained on the tray T of the copier, each in a same order of pages as that of the original documents stacked on the stacker tray 1.

B. Operation with two-sided originals (case of obtaining two copies from each of two originals)

As a specific example there will be explained a case, as shown in FIG. 14, of obtaining two one-sided or two-sided copies from two two-sided original documents bearing pages (1) to (4).

At first two originals are stacked in the order of pages, and are placed on the stacker tray 1 with the page (1) facing upwards.

Figure 6B:
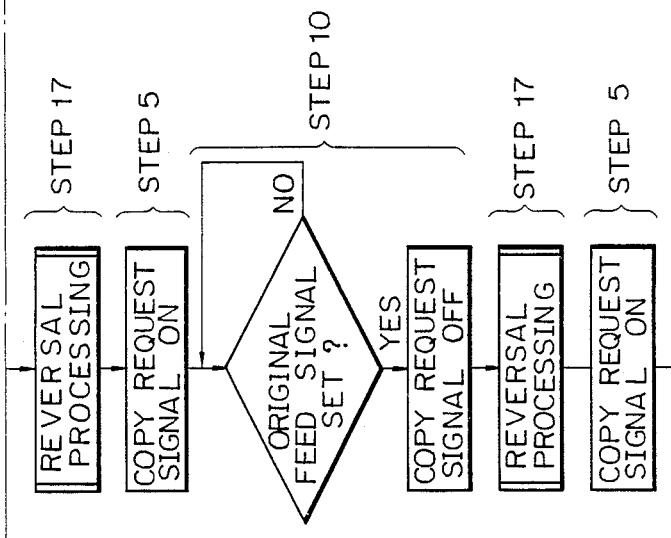
Figure 6C:
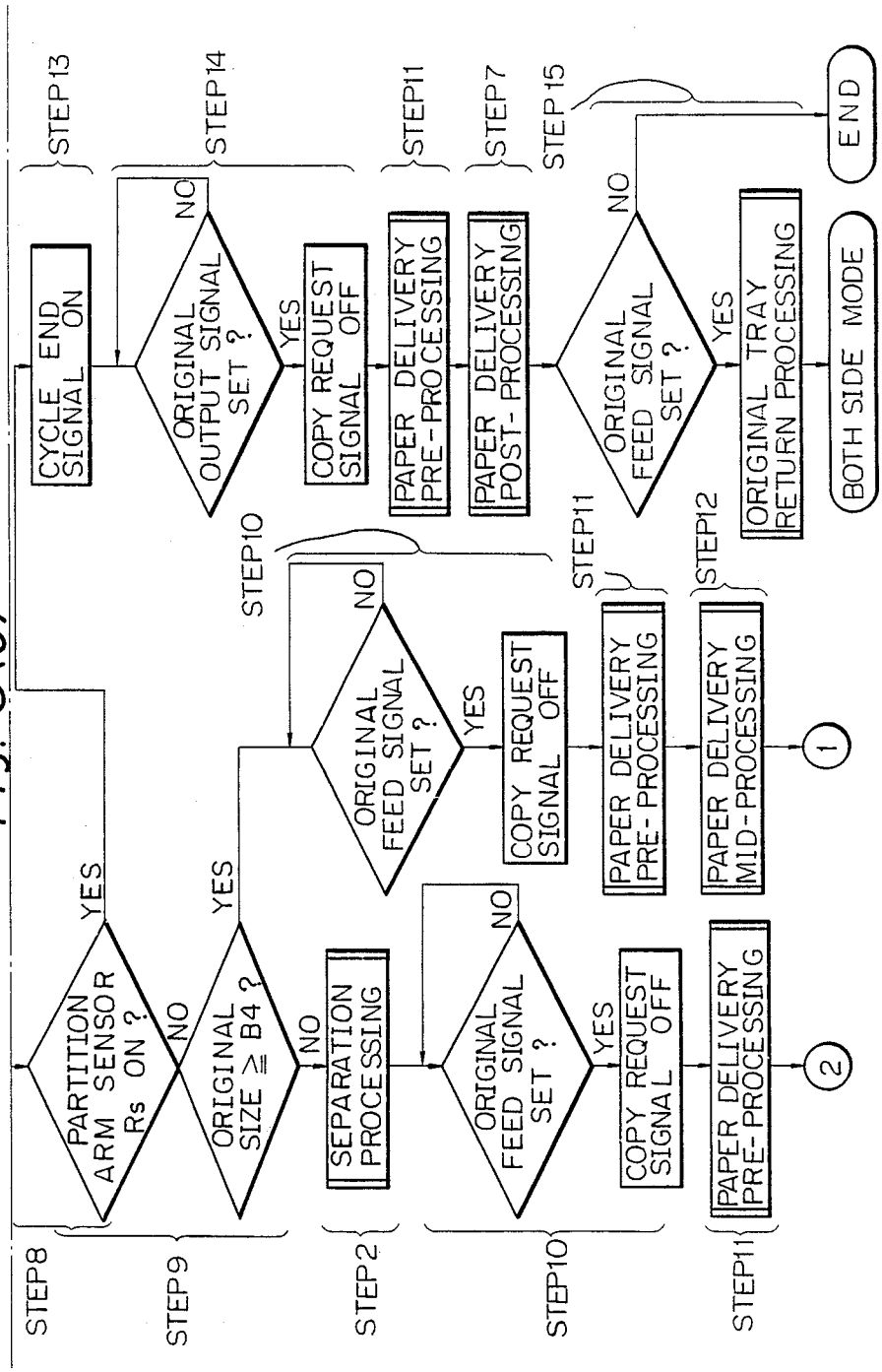

Then copying conditions, such as the selection of two-sided originals, or two copies, of one-side or two-side copying mode etc. are entered through an unrepresented operation panel of the copier 100, and the copy start button of said panel is actuated, whereupon a two-side mode is designated, thus activating a program for two-side process mode shown in FIG. 6.

(1) At first there are executed the aforementioned Steps 1, 2, 3 and 16 for separating the lowermost original of pages (3) and (4) from the stack on the stacker tray 1 and advancing said original to the platen glass. The feeding process in the Step 16 is different from the registration process in the Step 4 of the one-side mode, and is effected by feeding an original in a position bridging the sheet path IIa and the platen glass, turning off the driving motor 54 when the rear end of said original is detected by the registration sensor S2, then activating the transport counter for stopping the original in the vicinity of the left-hand end of the platen glass, and turning off the belt driving motor 55 upon expiration of said counter.

It is to be noted that in this feeding step, the original need not be stopped at the exposure position X in FIG. 2 as in the aforementioned registration step but can be stopped at a position Y at the left-hand end of the platen glass with a shorter distance of advancement. Also in this case an exact registration of the original document by deceleration by braking from the moment of rear end detection by the registration sensor S2 followed by stopping with the electromagnetic brake 56, as in the aforementioned registration step, is no longer necessary. Consequently it is rendered possible to simplify the control process by dispensing with these control steps, and to increase the transport speed of the original (cf. FIG. 9-1).

(2) The original once stopped on the platen glass is inverted by a Step 17 in the following manner. At first the sheet discharge pre-process of Step 11 is executed whereby the front end of the original document is held by the feed rollers 6, 6b, thus avoiding skewed feeding.

Then the driving motor 54 is activated, so that the original document is fed along a course of the feed rollers 6, 6b, then second sheet path IIIa, feed rollers 10, 10a, sheet path IVa and feed rollers 11, 11a.

Then the belt driving motor 55 is turned off when the rear end of the original is detected by the sheet discharge sensor S3, and, upon expiration of an inversion counter, the feed rollers 10, 10a, 11, 11a are switched to reverse rotation. In the course of counting operation of said inversion counter, the rear end of the original enters the second sheet path IVa and reaches a position in front of the rollers 10, 10a.

The reverse rotation of the rollers 10, 10a, 11, 11a transfers the original from the second sheet path IVa to the 3rd sheet path Va through a switchback, and the original then enters the 3rd sheet path VIa in which the feed rollers 9, 9a are rotated in the forward direction.

After the rear end of the original is detected by the inversion sensor S4, another inversion counter is activated, and, upon the expiration thereof, the feed rollers 9, 9a are switch to rotation in reverse direction. During the counting operation of said another counter, the rear end of the original enters the 3rd sheet path VIa and reaches a position in front of said rollers 9, 9a.

The above-mentioned reverse rotation of the rollers 9, 9a transfers the original by switch-back into the 4th sheet path VIIa. In this state the movable deflector plate 23 is shifted to the full-lined position, and the original proceeds along the upper face thereof toward the left-hand side of the platen glass 12.

Then, when the front end of said original document in the 4th sheet path VIIa is detected by the inversion registration sensor S5, the belt 8 is activated in the forward direction, whereby the original document proceeds along the upper face of the movable deflector plate 23, then in the gap between the front edge thereof and the belt 8 and finally into the gap between said belt 8 and the platen glass 12, and is transported by the belt 8 toward the left-hand end of the platen glass 12.

Then, after the lapse of a determined time measured by the aforementioned another registration counter from the detection of the rear end of the original document by said inversion registration sensor S5, the belt 8 is stopped and the electromagnetic brake is simultaneously energized for 100 ms. Besides, during the counting operation of said counter, the belt driving motor 55 is decelerated to achieve a higher precision in the stopping position. When stopped, the rear end of the original document is positioned at the determined reference position X on the platen glass 12 (cf. FIG. 9-2).

In this manner the page (4) of the original document is inverted downwards and positioned on the platen glass 12.

(3) Subsequently the copy request signal is turned on (Step 5) whereby the optical system 346, 347a in the copier is activated to effect the exposure and copying process for the downward page (4) of the original. In case the one-side copy mode is selected in advance, the image of said page (4) is formed on a first face of a copy sheet, which is then discharged, with the image bearing face upwards, onto the tray T. On the other hand, in case of the two-side copy mode, the copy sheet is not discharged to the tray T but is fed to the intermediate tray 340 constituting a re-feed mechanism in the copier.

(4) Then, upon completion of the exposure step in the copier (Step 10), the aforementioned inversion step (Step 17) is conducted to place the page (3) downwards at the exposure position on the platen glass, and the copy request signal is turned on and supplied to the copier (Step 5).

(5) Subsequently the copier conducts the exposure and copying process for said page (3). In case the one-side copy mode is selected, the image of said page (3) is formed on a first face of a copy sheet, which is then discharged, with the image-bearing face upwards, onto the copy sheet bearing the image of page (4) and already discharged on the tray T. On the other hand, in case of the two-side copy mode, the copy sheet already having the image of page (4) on the first face thereof is fed from the intermediate tray 340, and the image of said page (3) is formed on a second face of said copy sheet to form a two-sided copy, which is then discharged, with the face bearing the image of page (3) upwards, onto the tray T.

(6) In the course of the exposure step in the copier, the Steps 8 and 9 are executed as in the aforementioned one-side copy mode to identify whether the recycle sensor RS is turned on by a circulation of the original documents, and whether the original document positioned presently on the platen glass is of equal to or larger than B4 size, and the ensuing process is branched into three ways as will be explained in the following, according to the result of said identifications.

(7-1) In case the pages (3) and (4) of the original document is of A4 size, the succeeding original of pages (1) and (2) is separated and fed to the feed rollers 6, 6a (Step 2) as in the foregoing section A-(8), and, upon completion of the exposure step (Step 10), the pre-process for sheet discharge is effected to feed the original of pages (3) and (4) to the feed rollers 6, 6b. Then the sheet feeding step (Step 3), transport step (Step 16) and post-process for sheet discharge (Step 7) are conducted to discharge the original of pages (3) and (4) through the sheet paths IIIa and IVa to the stacker tray while feeding the original of Pages (1) and (2) through the sheet paths Ia and IIa to the position Y on the platen glass. Subsequently the original of pages (1) and (2) on the platen glass is inverted in the aforementioned inversion step (Step 17) whereby the page (2) is set downwards at the exposure position on the platen glass, and the copier starts the exposure process.

(7-2) In case the original of the pages (3) and (4) is of A3 size, upon completion of the exposure process (Step 11) as in the aforementioned section A-(11), the pre-process for sheet discharge (Step 11) and the post-process for sheet discharge (step 12) are effected to advance the original of the pages (3) and (4) to a position bridging over the platen glass and the sheet paths IIIa, IVa, then the separation step (Step 2) is effected to separate the succeeding original of pages (1) and (2), and the page (2) is set downwards on the platen glass by the discharge, feeding and inversion of the original documents as described in the section (7-1).

(7-3) During the exposure for the page (1), the partition arm 22 descends by the weight thereof to activate the recycle sensor RS. Thus, as in the foregoing sections (12) and (13) for the one-sided originals, upon completion of the exposure step (Step 14), the original document is discharged through the sheet paths IIIa, IVa to the stacker tray (Steps 11, 7).

A circulation of the originals is completed in this manner. If another circulation is required as in the foregoing case A-(14), the two-side copy mode is activated again after the Step 15 confirms that the original documents have been returned.

(9) The above-described operation is conducted in succession for each of the original documents stacked on the stacker tray 1, thus obtaining two sets of one-side or two-side copies, on the tray T, each in the same order of pages as in the original documents stacked on the stacker tray 1.

Although the foregoing embodiment has been limited to an apparatus in which the original documents are circulated, the present invention is by no means limited to such embodiment but is subject to various modifications within the scope and spirit of the appended claims.

What is claimed is:

1. A document handling apparatus comprising:
   document transport means for feeding an original document to a position for exposure and discharging said original document from the position for exposure after the completion of an exposure step, said feeding and discharge being conducted on the same side of the position for exposure;
   detecting means for detecting the size of the original document to be fed to the position for exposure;
   storage means for storing therein the size of the original document detected by said detecting means; and
   control means for controlling said document transport means in such a manner that the discharge of the exposed document from the position for exposure is conducted simultaneously with the feeding of a succeeding original document to the position for exposure, and that the document to be discharged and the document to be fed mutually overlap and slide on each other in the course of said feeding and discharge,
   said control means controlling a timing of the feeding of the succeeding original document in accordance with the size of the original document fed to the position for exposure so that the amount of the overlap between the document to be discharged and the document to bed fed is constant regardless of the detected size of the original document,
   wherein when the size of the original document stored in said storage means is smaller than a predetermined size, said control means delays the feeding of the succeeding original document to the position for exposure until the original document is discharged by a first predetermined amount, and when the size of the original document stored in said storage means is larger than the predetermined size, said control means delays feeding of the succeeding original document to the position for exposure is until the original document is discharged by a second predetermined amount, the second predetermined amount being larger than the first predetermined amount.

2. A document handling apparatus according to claim 1, further comprising document stack means for stacking original documents, wherein said control means is adapted to control said document transport means in such a manner that, when the exposed document is smaller than the predetermined size, the document to fed next is in advance transported from said document stack means to a first position in a feed path leading to said exposure position, and is then fed from said first position in response to the discharge of the exposed document by the first predetermined amount and to the exposed document reaching a second position on a discharge path.

3. A document handling apparatus according to claim 1, further comprising document stack means for stacking original documents, wherein said control means is adapted to control said document transport means in such a manner that, when the exposed document is larger than the predetermined size, the document to fed next is transported from said document stack means in response to discharge of the exposed document by the second predetermined amount.

4. A document handling apparatus according to claim 3, wherein said second predetermined amount is variable according to the size of the document.

5. A document handling apparatus comprising:
stacker means for stacking plural documents;
separating means for separating the documents one by one; separated
transport means for feeding a document by said separation means to a position for exposure;
discharge means for discharging the exposed document from the position for exposure;
detecting means for detecting the size of each document to be fed by said transport means; and
control means for controlling said separating means to adjust a separation timing of a succeeding document to be fed to the position for exposure in accordance with the document size detected by said detecting means,
wherein said control means is adapted to control said separating means so that when the document fed to the position for exposure is smaller than a predetermined size, the separation of a succeeding document is effected prior to discharge initiation of a preceding document by said discharge means, and when the document fed to the position for exposure is larger than the predetermined size, the separation of the succeeding document is effected after discharge initiation of a preceding document by said discharge means.

6. A document handling apparatus comprising:
document transport means capable of operating either in a first mode for feeding a document onto a support for exposure or in a second mode for feeding a document onto said support for causing a switch-back movement of said document; and
control means for controlling said document transport means in such a manner as to stop the document on said support in said first mode different from the stop position of the document on said support in said second mode, the stop position of the document in said second mode being positioned upstream in the feed direction of the document from the stop position of the document in said first mode.

7. A document handling apparatus according to claim 6, wherein said control means comprises brake means for stopping the transport operation of said document transport means, and is adapted to activate said brake means in said first mode after the transport speed of the document is gradually decreased, and to activate said brake means in said second ode without decreasing said transport speed.

8. A document handling apparatus comprising:
stacker means for stacking documents;
document feeding means for feeding a document from said stacker means to a position for exposure and returning the document after the exposure thereof to said stacker means;
first detecting means for detecting one circulation of a bundle of documents stacked on said stacker means, said first detecting means having a partition member set on the document bundle, and a sensor for sensing said partition member;
second detecting means for detecting the presence of the document in an inlet section of said document feeding means; and
control means for monitoring an output from said second detecting means for a predetermined period prior to initiation of re-feeding of the documents from the stacker means so as to control said document feeding means to continue an operation thereof, upon setting of said partition member on the document bundle, when the document is detected within the predetermined period, and to inhibit the operation thereof, without setting said partition member on the document bundle, when the document is not detected within the predetermined period.

* * * * *

UNITED STATES PATENT AND TRADEMARK OFFICE
CERTIFICATE OF CORRECTION

PATENT NO. : 4,817,933
DATED : April 4, 1989
INVENTOR(S) : TAKESHI HONJO, ET AL.

It is certified that error appears in the above-identified patent and that said Letters Patent is hereby corrected as shown below:

COLUMN 1,
    line 64, "no" should read --not--.

COLUMN 4,
    line 13, "different," should read --differently,--;
    line 14, "allows to" should read --allows one to--;
    line 16, "Also" should read --Also,--;
    line 17, "allows to" should read --allows one to--;
    line 25, "Also" should read --Also,--.

COLUMN 5,
    line 44, "roller" should read --rollers--.

COLUMN 6,
    line 17, "constitutes" should read --constitute--;
    line 38, "exposes" should read --expose--;
    line 45, "originals by" should read --original by a--;
    line 63, "paths IA, IIa" should read --paths Ia, IIa--;
    line 66, "is contact" should read --is in contact--;
    line 67, "3" should read --23--.

COLUMN 7,
    line 50, "5th" should read --fifth--;
    line 62, "the" (first occurrence) should read --its--.

UNITED STATES PATENT AND TRADEMARK OFFICE
CERTIFICATE OF CORRECTION

PATENT NO. : 4,817,933

DATED : April 4, 1989

INVENTOR(S) : TAKESHI HONJO, ET AL.

It is certified that error appears in the above-identified patent and that said Letters Patent is hereby corrected as shown below:

COLUMN 8, line 3, "a" should be deleted;

line 5, "a direction of" should read --the direction of the--;

line 12, "a" should read --the--;

line 13, "a" (second occurrence) should read --the--;

line 28, "11-17" should read --I1-I7--;

line 51, "abovementioned" should read --above-mentioned--.

COLUMN 9, line 12, "mode etc." should read --mode, etc.,--;

line 18, "manner" should read --manner:--;

line 23, "of" should read --off--.

COLUMN 10, line 7, "selected smaller" should read --selected to be smaller--;

line 38, "there" should read --it--;

line 49, "identi-" should read --determined,--;

line 50, "fied" should be deleted;

line 65, "manner" should read --manner:--.

UNITED STATES PATENT AND TRADEMARK OFFICE
CERTIFICATE OF CORRECTION

PATENT NO. : 4,817,933

DATED : April 4, 1989

INVENTOR(S) : TAKESHI HONJO, ET AL.

It is certified that error appears in the above-identified patent and that said Letters Patent is hereby corrected as shown below:

COLUMN 11, line 21, "6, 6a" should read --6, 6b--;

line 47, "us" should read --is--;

line 56, "operaiton" should read --operation--;

line 63, "wards," should read --upwards,--.

COLUMN 12, line 11, "ations in" should read --ations which occur in--; same line, "which the" should read --which, by way of example, the--;

line 17, "afore-mentioned" should read --aforementioned--;

line 20, "size" should read --size,--;

line 21, "a" should read --the--;

line 22, "form" should read --from--.

COLUMN 13, line 54, "mode etc." should read --mode, etc.,--.

COLUMN 14, line 5, "that" should read --that,--;

line 38, "3rd" should read --third--;

line 39, "3rd" should read --third--;

line 44, "switch" should read --switched--;

UNITED STATES PATENT AND TRADEMARK OFFICE
CERTIFICATE OF CORRECTION

PATENT NO. : 4,817,933

DATED : April 4, 1989

INVENTOR(S) : TAKESHI HONJO, ET AL.

It is certified that error appears in the above-identified patent and that said Letters Patent is hereby corrected as shown below:

COLUMN 14, line 46, "3rd" should read --third--;

line 49, "4th" should read --fourth--;

line 55, "4th" should read --fourth--.

COLUMN 16, line 2, "(step 12)" should read --(Step 12)--;

line 22, "(9)" should read --(8)--;

line 60, "bed" should read --be--.

COLUMN 17, line 36, "separated" should be deleted;

line 37, "document by" should read --document separated by--.

UNITED STATES PATENT AND TRADEMARK OFFICE
CERTIFICATE OF CORRECTION

PATENT NO. : 4,817,933
DATED : April 4, 1989
INVENTOR(S) : TAKESHI HONJO, ET AL.

It is certified that error appears in the above-identified patent and that said Letters Patent is hereby corrected as shown below:

COLUMN 18, line 26, "second ode" should read --second mode--;

line 45, "the stacker means" should read --said stacker means--.

Signed and Sealed this

Twenty-seventh Day of March, 1990

Attest:

JEFFREY M. SAMUELS

Attesting Officer

Acting Commissioner of Patents and Trademarks